INVENTOR
Leslie Jack Derham

INVENTOR
Leslie Jack Derham

INVENTOR
Leslie Jack Derham

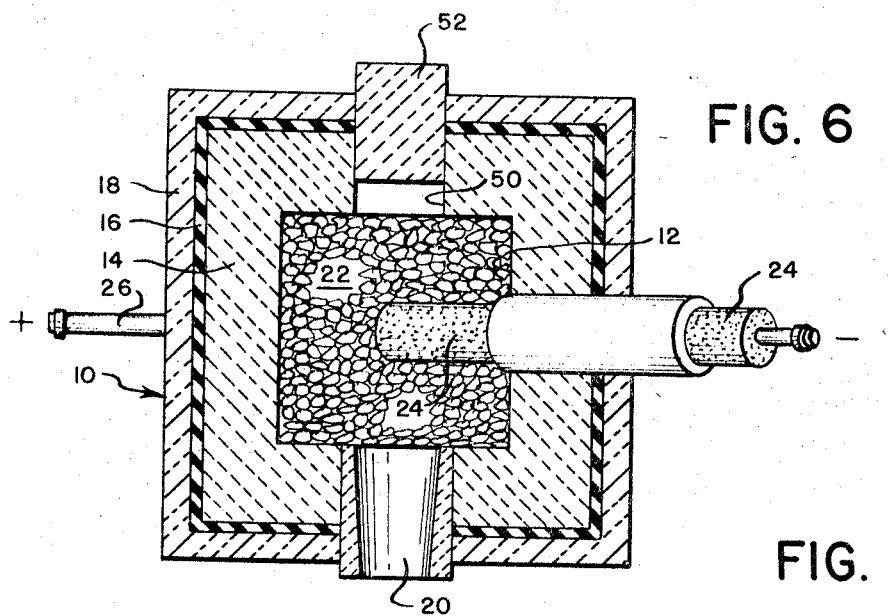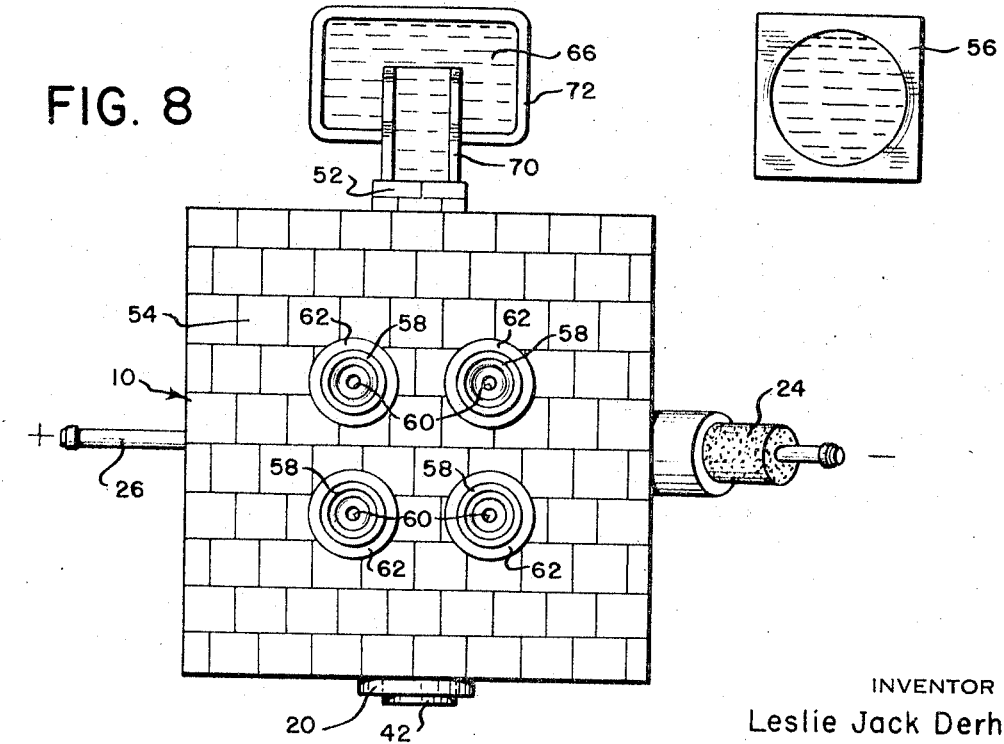

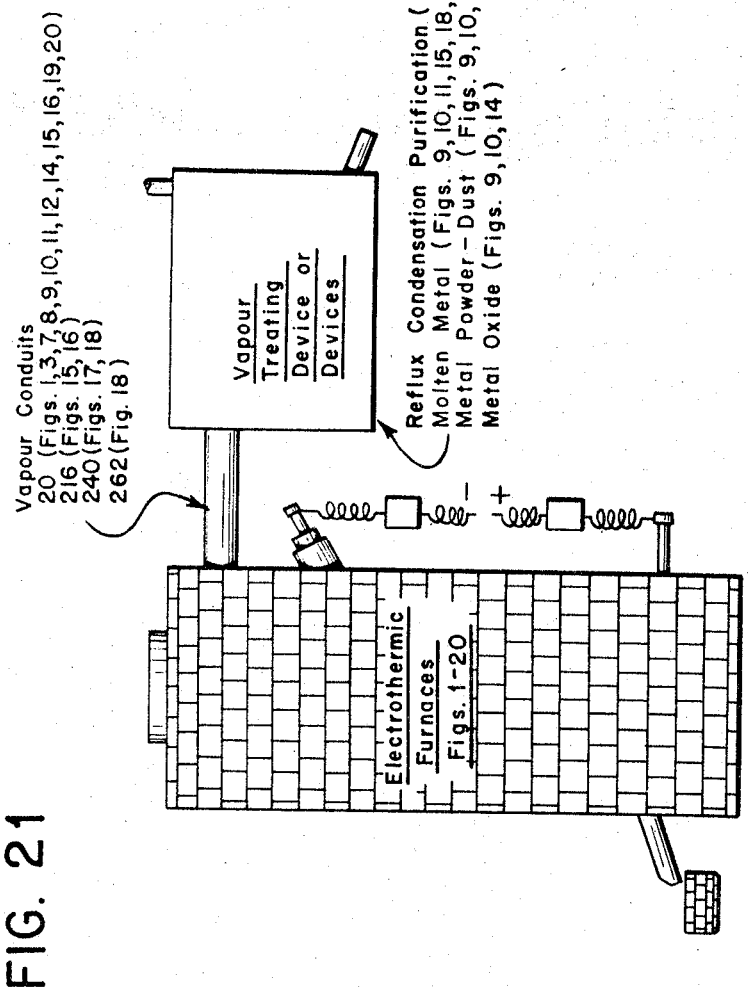

United States Patent Office 3,448,973
Patented June 10, 1969

3,448,973
APPARATUS FOR PURIFYING METALS AND RECOVERY OF METAL PRODUCTS THEREFROM
Leslie Jack Derham, Avonmouth, Bristol, England, assignor to Imperial Smelting Corporation (N.S.C.), Limited, London, England, a British company
Continuation-in-part of application Ser. No. 308,134, Sept. 11, 1963. This application Sept. 22, 1965, Ser. No. 489,268
Claims priority, application Great Britain, Sept. 27, 1962, 36,763; Oct. 15, 1962, 38,975
Int. Cl. C21b; H05b 3/60; C22b
U.S. Cl. 266—37                                   21 Claims

ABSTRACT OF THE DISCLOSURE

An upright electrothermic furnace heating chamber is described for recovering at least one volatilizable metal present in a metal alloy containing at least one other metal with a boiling point higher than the boiling point of the metal-to-be-recovered, in which a column of mixed (a) relatively large carbon lumps and (b) relatively small briquettes containing the metal alloy in finely divided form is confined in and made a structural operative part of the upright heating chamber. The column descends substantially continuously through the electrothermic heating chamber while a current of electricity is passed through the column to generate enough heat to melt the volatilizable metal-to-be recovered in the briquettes and to cause the resulting molten metal to ooze out of and to form films of molten metal thereof on the briquettes as well as on the carbon lumps, and streamlets of trickling molten metal pass downwardly through the column. The films and trickling streamlets are sufficient in amount to form an essential overall physical conductor for the passage therethrough of the current of electricity. The films of molten metal on the carbon lumps and the metal alloy briquettes and the resulting trickling molten metal-to-be-recovered are sufficient as a conductor to permit the original low electrical conductivity and low electrical conductance column to change into a relatively high electrical conductance and hence a relatively high electrical conductance column and thus provided a highly efficient and effective electrothermic heating chamber selectively to melt and then to vaporize the molten metal-to-be-recovered. The resulting metal vapour is withdrawn from the chamber and separately treated in any desired manner.

---

The present application is a continuation-in-part of my pending application Ser. No. 308,134 filed Sept. 11, 1963 and now abandoned.

Related applications, all filed simultaneously herewith, are Ser. Nos. 489,263, 489,264, 489,265, 489,266, and 489,267.

This invention relates to method of and apparatus for purifying metals and the recovery of the purified metals as such in molten or solid slab, or in solid powder or dust form; or as a compound, such as solid metal oxides. The invention relates more particularly to a purification system involving the selective vapourization and withdrawal of one or more metals and the selective retention and withdrawal of one or more unvapourized molten metals.

While the practice of the invention is applicable to a plurality of metals, and their alloys, more especially the lower melting point and the lower boiling point metals, so far as vapourizaton is concerned, it is proposed to emphasize below particularly the treatment of impure zinc; although calling attention also to other metals amenable to the procedure or procedures herein contemplated. The principal limitation is the ability of the equipment, the apparatus, in the system economically to withstand necessary wear and tear. The invention is practiced in a continuous, or substantially continuous, treatment operation.

Zinc

The chief zinc ore is zinc blende, or sphalerite, ZnS. Other ores include calamine, $Zn_2SiO_4 \cdot H_2O$; smithsonite, $ZnCO_3$; zincite, $ZnO$, willemite, $Zn_2SiO_4$; and franklinite, $(Zn, Fe, Mn)O \cdot (Fe, Mn)_2O_3$.

Zinc produced pyrometallurgically and electrothermically with carbon as a reducing agent is sometimes contaminated with such major impurities as lead, iron, cadmium, tin, sulphur, arsenic, antimony, manganese, and copper, and such minor impurities as nickel, cobalt, germanium, thallium, mercury, silver and gold. To obtain high purity zinc, it must, of course, be suitably refined.

The conventional method of purification is to boil the zinc metal by heating it in a retort or a boiler composed of superimposed trays down which the molten zinc flows. This retort has to be constructed of refractory material, the thermal resistance of which limits the rate of heat transfer. Any residual material in the retorts further reduces the rate of heat transfer. A further disadvantage is that the retorts or tray columns are susceptible to thermal shock.

It is known to boil zinc metal electrothermically by means of resistor heaters from which the heat is radiated to the zinc metal. Owing to the low emissivity of liquid zinc, however, most of the heat radiated from the resistor heaters is reflected by the liquid zinc back to the refractory roof of the furnace, which thereby becomes heated to a much higher temperature than the zinc metal. This method of heat supply is therefore inefficient.

In accordance with the invention disadvantages of the kind enumerated are for the most part avoided. Zinc vapour is produced from metallic zinc by a new method, which is both simple in principle and highly efficient, and which can be carried out in apparatus that is both simple and durable. That method and apparatus involve a number of highly useful modifications for the production of zinc vapour from molten metallic zinc by means of heat generated by electric current.

The invention involves the production of relatively pure zinc vapour from zinc metal containing less volatile impurities, such as lead, by supplying sufficient electrothermic heat to the molten impure zinc metal to volatilize a major portion of the zinc, leaving the less volatile metals with a small amount of residual molten zinc.

Another aspect of the invention is to obtain relatively pure zinc metal from zinc metal containing cadmium as an impurity, by supplying sufficient electrothermic heat to the molten impure zinc metal to volatilize part of the zinc and substantially all of the cadmium, the residual molten zinc thus obtained being substantially free from cadmium.

In the practice of the invention one is able to produce purified zinc metal, zinc dust of controlled particle size and of high metallic zinc content, and zinc oxide.

The high electrical conductivity of molten zinc has hitherto made it impractical to volatilize molten zinc by supplying electrothermic heat as electric current passing through the molten zinc.

I have discovered that when molten zinc is distributed substantially evenly over a packed column of carbonaceous solids or lumps or briquettes, to which an electric current is applied, the mode of flow of the zinc is such that its high electrical conductivity does not result in such a high electrical conductance of the flowing zinc as to make electrothermal heating impractical.

The invention further contemplates a method of and apparatus for producing relatively pure zinc vapour from zinc metal containing less volatile impurities, such as lead and iron, in which the impure molten zinc is supplied to the top of a packed column of carbon lumps and electrothermic heat is applied, through electrodes at the top and the bottom of the column, directly to the molten zinc metal as it flows down the column, whereby most of the zinc is volatilized, while the small remainder of the zinc, containing the less volatile metallic impurities, is run off from the bottom of the column as zinc residual. Since the electrothermic heat is supplied directly to the molten zinc metal, the rate at which zinc is vapourized is closely related to the rate of supply of electrical energy. If the rate of supply of electrical energy is maintained constant, the rate of volatilization of zinc can likewise be maintained constant. With a constant rate of supply of molten zinc to the column, a constant ratio of zinc volalized to zinc run off from the bottom of the column can be maintained. The zinc vapour, separated from its less volatile metal impurities, can be condensed to molten zinc. This condensation can be effected by conducting the zinc vapour to a condenser constructed of refractory material, such as silicon carbide, the surface area of the condenser being sufficient to cool the zinc vapour down to liquid zinc.

The invention also relates to the production of relatively pure metal vapours from metal alloys with other metals. One example of such a product is a zinc-iron alloy, commonly known as hard metal, that is recovered from the bottom of galvanizing pots. Other examples of such zinciferous materials are zinc alloys in which a main component, apart from zinc, is aluminum, In the process of this invention, the zinc alloy is first powdered by heating it to its hot-short temperature range, not far below its melting point. The fragmentation of the alloys is carried out by milling the alloy lumps in a rotary kiln with steel rods or steel balls, heat being applied to the kiln from an external source. The resulting metallic powder is then briquetted with wet or damp clay, together with a small amount of a carbonaceous material, such as anthracite coal; after which the bsiquettes are dried to harden or indurate them. During the drying out operation, moisture and hydrocarbons are driven from the metal-containing briquettes. This is advantageous because it facilitates the condensation of the metal, such as zinc vapour. The vapour should be as free as possible from admixture with other gasses or vapours, particularly those that, like water vapour, can oxidize the metal (zinc) vapour. The metal-containing briquettes thus produced, together with coke lumps, are introduced into an electrothermic furnace, where the zinc is distilled off. The zinc vapour may be condensed to zinc metal or converted to zinc dust or to zinc oxide pigment.

In order to improve further the purity of the zinc metal, the zinc vapour, before being passed to the condenser, may be conducted upwards through a refluxer column made of refractory material, such as silicon carbide. Some of the zinc metal condenses in this refluxer column and flows down the column countercurrent to the rising zinc vapour, whereby any non-volatilized metal impurities in the vapour are transferred to the downflowing liquid zinc. From the top of the column, the purified zinc vapour is then conducted to a condenser.

The invention also involves a method of and apparatus for obtaining relatively pure zinc metal from zinc metal containing a more volatile metal impurity, such as cadmium, in which the molten cadmium-containing zinc metal is supplied to the top of a packed column of coke lumps and electrothermic heat is supplied directly to this impure molten zinc metal at such a rate that some of the zinc is volatilized together with substantially all of the cadmium, while the rest of the zinc, substantially free from cadmium, is run off from the bottom of the column. The volatilized zinc and cadmium can be conducted directly to a condenser.

Alternatively, the volatilized zinc and cadmium may be conducted upwards through a reflux column constructed of superimposed trays made of suitable refractory material, such as silicon carbide, the top of this column being cooled so that much of the upcoming zinc vapours are condensed; and the resulting condensed zinc metal flows down the reflux column countercurrently with the upcoming vapours, only to be re-volatilized. The zinc vapours thereby become enriched in cadmium, and the zinc vapour leaving the top of the reflux column is conducted to a condenser.

In addition the invention includes a method of and apparatus for obtaining high purity zinc metal from zinc containing impurities, such as cadmium, that are more volatile than zinc, and other impurities, such as lead and iron, that are less volatile than zinc. In this process the less volatile impurities are first removed by volatilizing part of the zinc and passing the resulting vapours through a reflux column, and then a condenser, as already described. The condensed metal is then conducted to another electrothermic boiler, where part of the zinc metal is boiled off to remove the cadmium; the cadmium fraction containing some zinc is separately condensed and collected; and the balance of the zinc is run off from the base of the column as molten zinc freed from cadmium and also from other more volatile impurities.

The invention also involves a method of and apparatus for making zinc dust or powder in which electrothermic heat is supplied directly to molten zinc flowing down a packed column of carbon lumps or briquettes and the zinc vapour thus generated is supplied to a condensation system where it is rapidly chilled by a gas inert to the zinc. The inert gas is recirculated over and over again through the condensation system. The size of the dust particles produced is controlled by controlling the ratio of the volume of recirculated gas to the volume of zinc vapour entering the condensation system. Because of its ready availability and cheapness, nitrogen is usually the preferred inert gas; although argon or helium may be used.

As already indicated, the invention further includes a method of and apparatus for making zinc oxide in which electrothermic heat is supplied directly to molten zinc flowing down a packed column of carbon lumps and the zinc vapour thus generated is oxidized by admixture with a controlled volume of air.

*Lead*

Most of our lead today is derived from one mineral, galena, PbS; and is recovered by lead-blast furnace smelting. Lead ores are generally of the "argentiferous" type, containing important amounts not only of silver, but also of gold and copper, which are recovered as by-products. In most ores the lead sulphide is usually associated with zinc sulphide, and either of the two may predominate. Smelting in blast furnaces is most often the best process because it allows recovery of the silver and gold and copper, and because the process is adapted to the handling of ores that are low in lead and high in impurities.

The lead ore, such as galena, concentrates are first roasted to remove most of the sulphur, changing lead sulphide, PbS, to a mixture of lead oxide, PbO, and lead sulphate, $PbSO_4$. When the roasted product, still containing some sulphur is smelted, a small amount of matte is sometimes formed. It, together with some slag, collects at the bottom of the furnace. The matte has the valuable function of taking up most of the copper present in the concentrates; any copper not entering the matte goes into the molten lead metal, from which it is later removed.

The amount of matte formed, and consequently the distribution of the copper, can be controlled by the amount of sulphur left in the roast. The lead collects at the bottom of the furnace in the form of lead bullion, and is removed through a liquid lead seal. The slag and matte are tapped together and run into settlers. The slag overflows from the settler, while the matte collects in the bottom of the settler.

The resulting lead bullion obtained from the blast furnace is refined and the silver and gold recovered from it; but, before that is done, other impurities, which interfere with the desilverisation process, must be removed. The chief impurities found in lead bullion are: silver, gold, copper, iron, antimony, nickel, cobalt, arsenic, tin, bismuth, sulphur, cadmium, and principally zinc.

The present invention lends itself readily to the partial purification of the lead bullion, particularly in respect of those impurities which volatilize at a temperature below the boiling point (1750° C.) of the lead. This includes such impurities as cadmium, arsenic, sulphur and zinc. Those impurities are readily boiled off, while the remaining metal impurities, particularly those with melting points below the boiling point (907° C.) of zinc, sink to the bottom of the furnace with the molten lead; and the partially purified lead bullion is then subjected to other processes of purification, with which the present invention is not concerned.

Cadmium

The commercial occurrence of cadmium is exclusively in combination with zinc ore, including complex ores of zinc, copper and lead. The normal cadmium content of zinc concentrates is less than 0.5%, although, in a few rare cases, it may run to 1–2%. Cadmium is therefore a by-product of zinc, lead and copper smelting. The by-product results in several ways. The present invention is concerned, more especially, with the refining of zinc by distillation which yields a fraction of high cadmium content. The cadmium content of these cadmium by-products may run from as little as 2–3% to 25% or more. The cadmium metal may be collected as powder, but usually is cast in molten form into bars or anodes, because the major use of cadmium is for plating.

The zinc produced by all the carbon reduction or smelting processes requires a refining step to produce zinc of the highest purity. A process widely used commercially is based on fractional distillation in reflux refining columns. A typical unit consists of two columns, followed by a single cadmium column. The columns serve to remove lead, iron and other high-boiling point metal impurities; whereas the cadmium column removes cadmium and other low-boiling point metal impurities.

The resulting cadmium may be subjected to the purification procedure of the present invention to eliminate the zinc and to produce high purity cadmium, which may be molded into desired shapes, or be converted to powder or to a compound, such as cadmium oxide.

Antimony

Antimony occurs in nature in both the free and combined states. The principal ore is stibnite, $Sb_2S_3$. Another source of antimony is senarmontite, $Sb_2O_3$. Antimony is quite frequently found associated with the ores of lead, zinc, copper, and silver. The free metal is prepared by reduction of antimony oxide with carbon. In the case of antimony sulphide, it is first roasted in air to give antimony tetraoxide, $Sb_2O_4$; which is then reduced with carbon. The stable form of antimony is the metallic modification. It forms brittle, silvery white, rhombohedral crystals which melt at 630.5° C. and have a boiling point of 1380° C.

Unrefined antimony contains such impurities as sulphur, iron, arsenic, tin and sometimes copper, gold, lead, zinc and cadmium. Such impure antimony may be treated in accordance with the present invention. The sulphur, arsenic, zinc and cadmium impurities may be readily distilled off at a temperature below the boiling point but above the melting point of the antimony, but in the vicinity of the boiling point of the zinc. The molten antimony may flow to the bottom of the furnace and there be run off; or it may be separately distilled at or slightly above its own boiling point, while the higher boiling point metal impurities remain behind. The separately distilled antimony may be condensed and molded as such into any desired solid form; or it may be converted into solid powder or into a solid compound, such as antimony oxide.

These and other features of the invention will be better understood, it is believed, by referring to the accompanying drawings, taken in conjunction with the following description, in which FIG. 1 is a vertical partial section of a furnace, illustrative of a practice of the invention, on the line 1—1 of FIG. 2;

FIG. 6 is a horizontal section on the line 6—6 of FIG. 2;

FIG. 7 is plan view of the top of the storage pot;

FIG. 8 is a plan view on line 8—8 of FIG. 2;

FIG. 11 is a simple diagrammatic elevation of apparatus, also illustrative of a practice of the invention, employable in the production of purified zinc metal and the like;

FIG. 12 is a diagrammatic view in elevation, with parts broken away, of apparatus, illustrative of a practice of the invention, used to produce zinc dust or powder;

FIG. 13 is an abbreviated diagrammatic view of a different embodiment of the inert gas compressor arrangement of FIG. 12;

FIG. 14 is a diagrammatic elevation, partly in section, of apparatus, illustrative of a practice of the invention, that may be used, for example, to produce high purity zinc oxide and the like;

FIG. 21 is an abbreviated composite representation, in the nature of a flow sheet, of the method and apparatus of the invention by specific references to the foregoing FIGS. 1–20.

FIGS. 1–8

Figure 1:
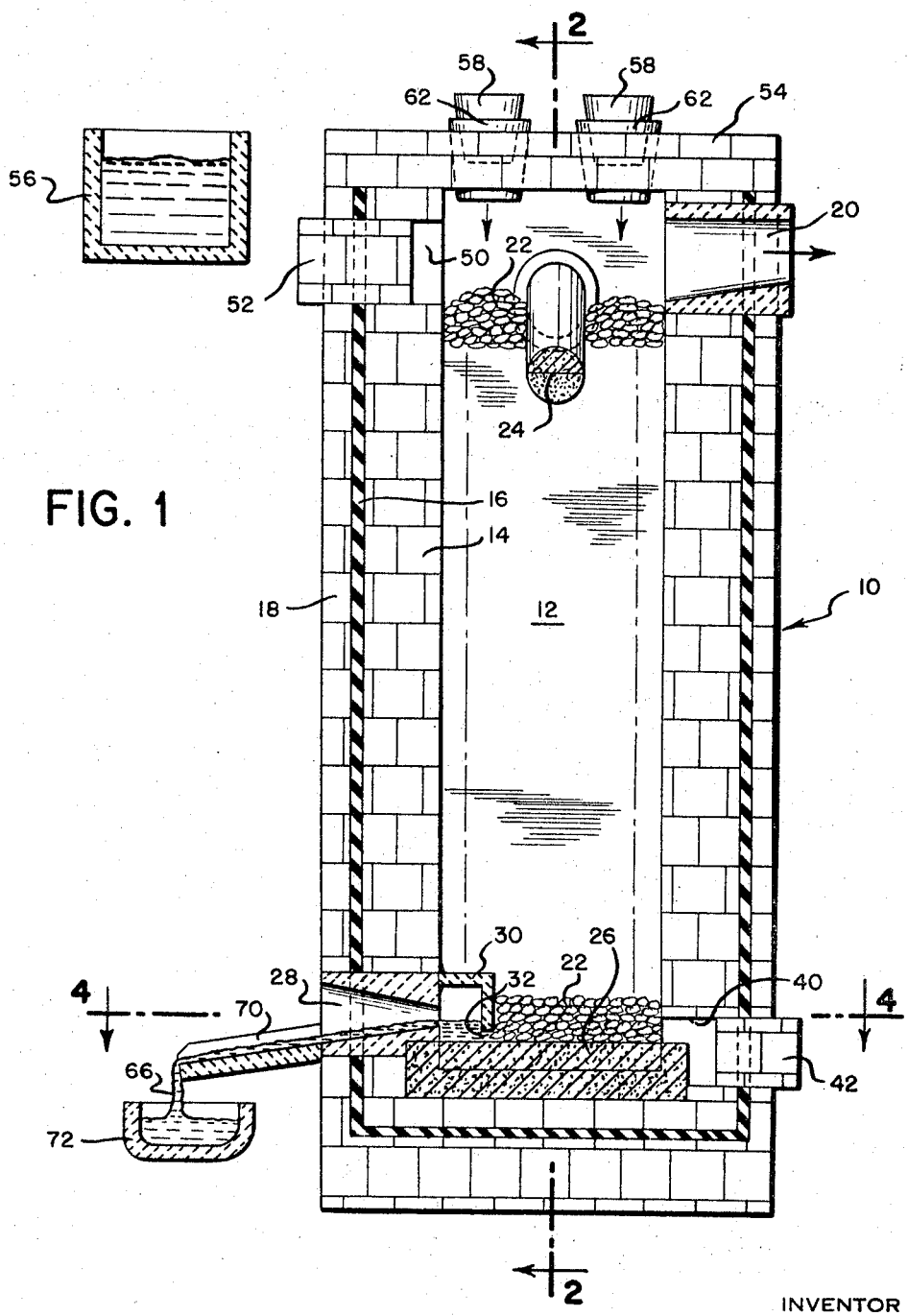
Figure 2:
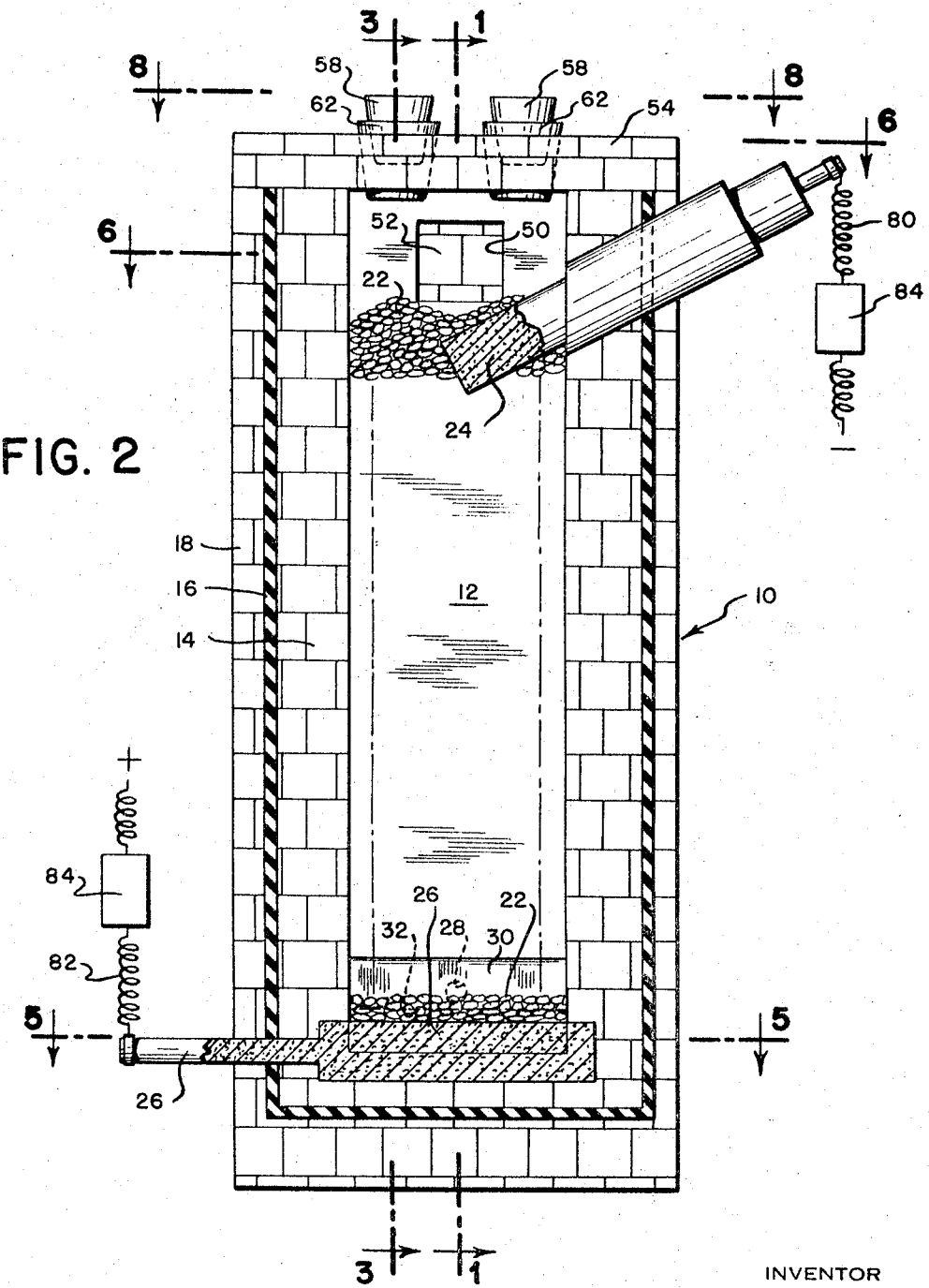
FIG. 2 is a vertical partial section of the same furnace on the line 2—2 of FIG. 1.

Referring more particularly to FIGS. 1–8, the apparatus shown includes an electrothermic furnace 10 in which the vaporization of a metal or metals is carried out, essentially in an upright shaft 12, with an inner layer 14 of a heat-insulating refractory brick, an intermediate layer 16 of mica to provide electrical insulation, and an outer layer 18 of highly insulating brick. There is an outlet 20 in the upper portion of the shaft for the escape of metal vapour, such as zinc vapour. The shaft is packed with sized coke, coke lumps, carbonaceous briquettes, or similar carbonaceous material 22 to form an upright, preferably vertical, column. A graphite electrode 24 extends deeply into the top portion of the coke column, through a side wall of the shaft.

At the bottom of the coke column is another graphite electrode 26, which serves as a bottom tray to collect the residual unvolatilized portion of the metal or metals treated in the furnace, such as zinc, lead, antimony, cadmium, etc. In the case of zinc, for example, this residual portion, which contains the less volatile metallic impurities, can be run off periodically through a taphole 28 in the bottom portion of the furnace. This taphole is kept closed, except during tapping periods; or it may be kept open, for example, by a partially submerged removable baffle 30, which allows a continuous outflow of molten metal. The lower end of the baffle extends below taphole 28, but above the top surface of electrode tray 26, to provide a low narrow passageway 32 for the flow of molten metal or metals thereunder from the electrode tray up to and out of the taphole. A cleanout port 40, normally filled with a removable brickwork panel 42, is provided in a suitable position, preferably directly opposite taphole 28, to enable any blockage on the electrode tray or in the taphole to be cleared.

A similar cleanout port 50, normally filled with a removable brickwork panel 52, is provided in a suitable position, preferably directly opposite the vapour outlet or offtake 20, that enables a tool to be inserted therethrough for cleaning purposes.

The furnace is surmounted by a carefully insulated top 54.

To continue with a description of the apparatus, in terms of zinc purification, as an illustrative example, the impure zinc to be charged to the furnace is first melted in a storage pot 56, from which four spaced tapered graphite crucibles 58 in the top 54, of furnace 10 are kept supplied with molten zinc. Each of the crucibles 58 (FIGS. 3 and 8) has in its base a centrally located small orifice 60 through which the molten zinc can pass into a similar but slightly larger tapered crucible 62; into the upper part of which the crucible 58 snugly fits. In the base of each of crucibles 62 is a centrally located orifice 64 (FIG. 3) somewhat larger than each of the orifices 60. Molten zinc flows at a steady rate through each of these orifices 64, and thus the zinc input to the furnace is distributed at four symmetrically placed points over the entire cross-sectional area of the furnace. The diameter of the orifices 60 is such that the desired rate of molten zinc flow into the furnace can be attained with the zinc in the crucibles 58 maintained at a convenient level 65, between full and half full, while the diameter of the orifices 64 is such that molten zinc flows through at the desired rate with only a small hydrostatic head maintained in crucibles 62. Spaced crucibles 62 fit snugly in their corresponding holes in the top 54 of the furnace; and, since crucibles 58 in turn fit snugly in crucibles 62, ingress of outside oxidizing air into the electrothermic furnace is inhibited. Due to the spacing of the crucibles the molten zinc is dropped onto and substantially evenly spread across the top of the column of coke 22. The zinc threads its way over and around the pieces of coke, as it percolates and trickles by gravity downwardly through the interconnecting interstices between the pieces of coke.

Any zinc oxide dross originally present on the body of molten zinc in storage pot 56 is skimmed off from time to time; and any dross subsequently formed by oxidation in crucibles 58 remains floating on top of the body of molten zinc contained therein, from which it may be skimmed from time to time, so that none of the dross can enter crucibles 62 where, since there is no access of air, no further oxide dross can form. Consequently, the molten zinc entering the furnace is substantially free from oxide dross. Further, with this method of introducing molten zinc into the furnace, one of the crucibles 58 can be replaced by another without allowing access of air to the furnace.

The residual unvolatilized molten zinc 66 at the bottom of the column, containing the less volatile metal impurities, is periodically or continuously removed through taphole 28 into a chute or trough 70 through which it flows and is collected in a pot 72.

Upper electrode 24 (FIG. 2) connects with an electrical power line 80 and lower electrode tray 26 connects with an electrical power line 82, both lines coming from a power source, direct or alternating current, not shown. The power input into the furnace is controlled by means of a voltage regulator 84.

Intially, it is the coke lumps which determine the electrical resistance characteristics of the column, but these are modified considerably when molten zinc flows over and down the column. The coke lumps are soaked with the passing molten zinc. The molten zinc tends to form zinc films or droplets on the surfaces of the coke lumps. Molten zinc probably seeps into cracks, crevices, channels, indentations and the like inevitably present in the coke lumps, often by capillary attraction. Heat is generated electrically largely in those zinc wetted areas; and, by virtue of this fact, the heat is used at high efficiency, having no thermal barriers to overcome. Efficient boiling is further promoted by the method used to distribute the molten zinc substantially evenly over and across the cross-sectional area of the top of the column.

EXAMPLE I

As an example, the furnace 10 used has a shaft 12 of square cross-section, 22 inches by 22 inches, and the distance between the inner tip of the electrode 24 and electrode 26 is 8½ feet. The shaft was almost filled with metallurgical coke of a sizing between ¾ inch and 1½ inch.

The furnace was fed with impure molten zinc from storage pot 56 at the rate of 9 pounds per minute, which was equally distributed through the four crucible orifices 60 symmetrically disposed at a radial distance of 6 inches from the centre of the furnace top. A controlled rate of feed of 2¼ pounds of molten zinc per minute through each orifice was obtained by fitting, to form orifices 60, a silica jet of 1.86 millimetre bore into the base of each of the graphite crucibles 58. The orifices 64 in crucibles 62 are ⅛ inch diameter.

Zinc, containing as its main impurity 1.2% lead, was fed into the furnace at the rate of 540 lb. per hour, of which 505 lbs. were volatilized and discharged through outlet 20 near the top of the furnace as high purity zinc; and 35 lb. were run off from the bottom of the furnace through chute 70 as residual zinc containing 16% lead. The power supply to the furnace was 180 kilowatts, 120 volts and 1500 amperes. The power consumed was thus 800 k.w.h. per ton of zinc volatilized; the conductance was 12.5 mhos.

Similar results were obtained with zinc of low lead content as feed metal. Pyrometallurgically produced zinc usually contains lead as its main impurity, with some iron and cadmium; other impurities usually being present in only very small concentrations. When zinc of this type is boiled in an electrothermic furnace according to the invention, the conductance of the charge comes within the range that makes electrothermic heating practicable.

The operator of the furnace adjusts the voltage regulator until a desired predetermined temperature of the column is reached. That optimum temperature is then maintained. Since the operation is a continuous one, once the optimum temperature point or range is established, there is little more for the operator to do, except to make sure occasionally that those conditions prevail. When everything is going properly, the furnace operates at just about capacity; and discharges metal, either as vapour or molten residual, as rapidly as impure metal is fed to the furnace.

Although all grades of primary zinc behave satisfactorily in this respect, the impurities in some types of secondary zinc alter the properties of the molten metal in such a way as to give too high a conductance; this effect is associated, for example, with the presence of aluminum. When an attempt was made to distil some secondary zinc-aluminum alloy, containing about 4 percent aluminum, a satisfactory distillation could not be carried out. A trial was then made with a mixture of equal parts of primary zinc and secondary zinc alloy, this mixture containing about 2% aluminum, in the same furnace as used for Example 1. With 30 volts, the current was 2100 amperes, this giving a power of only 63 kilowatts, the conductance of the charge having risen to 70 mhos., nearly six times as large as was found in the same furnace with primary zinc as the feed. In other words, the power of 63 kilowatts is not satisfactory because it is necesasry to obtain a high power input to the furnace coupled with a current low enough to be compatible with the current-carrying capacity of the remainder of the electrical equipment. Thus, there is a lower limit to the resistance of the furnace, below which the apparatus will not function.

A current of 2,100 amperes is near the safe maximum current-carrying capacity of the equipment, but the power input of 63 kilowatts is not sufficient to ensure a suitably high rate of metal distillation. Thus, if the resistance of the furnace drops to too low a level, operation becomes impractical and may be impossible. I have however found that with molten zinc flowing over the carbon lumps a reasonably high resistance can be obtained to effect the desired volatilization.

As already indicated the purified zinc vapour may be condensed to molten zinc by known methods, the zinc thus produced being substantially free of the less volatile metallic impurities. The zinc vapour may also be converted to zinc duct or powder by rapid chilling. To control the size of the duct particles, it is advantageous to circulate an inert gas under positive pressure around the condensing system. The zinc vapour may also be used for the production of zinc compounds, such as zinc oxide.

FIG. 9

Figure 9:
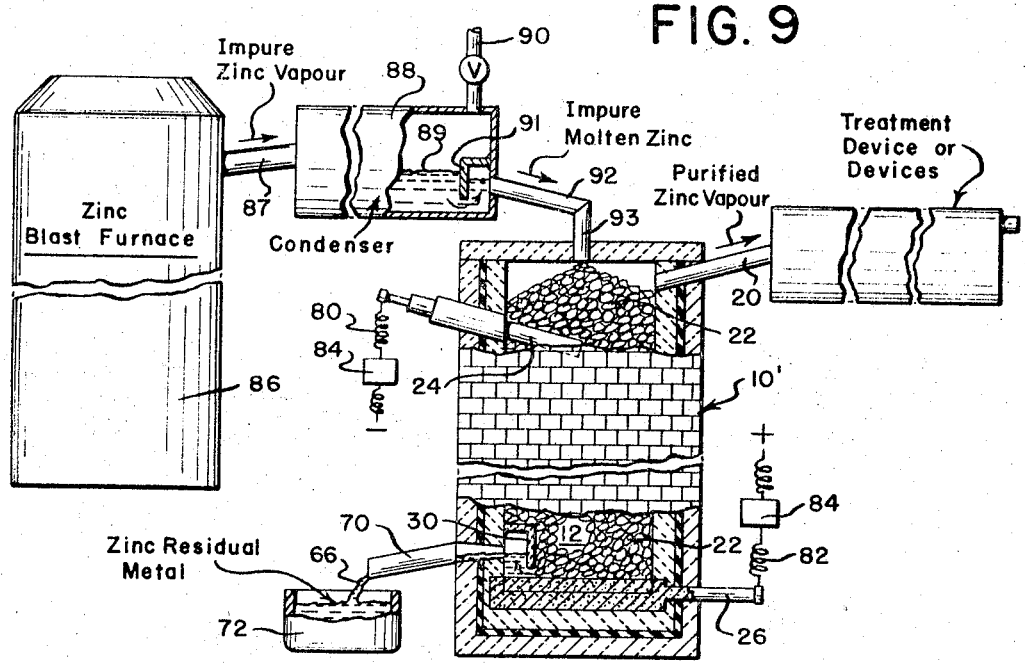
FIG. 9 is a diagrammatic view in elevation, with parts broken away, of the combination of a zinc blast furnace and a condenser with an electrothermic furnace of the invention.

Much of the world's zinc is produced pyrometallurgically, that is by smelting. Among the important techniques employed is that of the use of a zinc blast furnace. FIG. 9 illustrates the use of such a furnace in conjunction with the present invention.

A conventional zinc blast furnace (or other smelting furnace) 86 has a zinc vapour outlet 87 in its upper portion connecting a condenser 88, such as a lead splash condenser system, for the accumulation of a body of molten zinc 89. The condenser is provided with a valved gas escape conduit 90; a partially submerged discharge baffle 91; a downwardly declining molten zinc flow conduit 92, the discharge end 93 of which connects with the central top portion of an electrothermic furnace 10' (successive electrothermic furnaces, essentially the same in construction, will be identified with the numeral 10, to which is added a prime digit. They are operated in substantially the same manner).

As before, the impure molten zinc is dropped onto, and is spread laterally over, carbon lumps 22 forming column 12. Also, as before, a small amount of residual molten metal-to-be-refined 66 accumulates in the bottom portion of the furnace and escapes past submerged baffle 30 through trough or conduit 70 into receiving tank or container 72.

The bulk of the impure molten metal (such as zinc) escapes from the heated furnace chamber through outlet conduit 20 into any one of the treating devices to be described below, to be condensed as purified, or at least partially purified, molten metal; as metal dust or powder; or as metal oxide; or as a still further purified metal product.

FIG. 10

Figure 10:
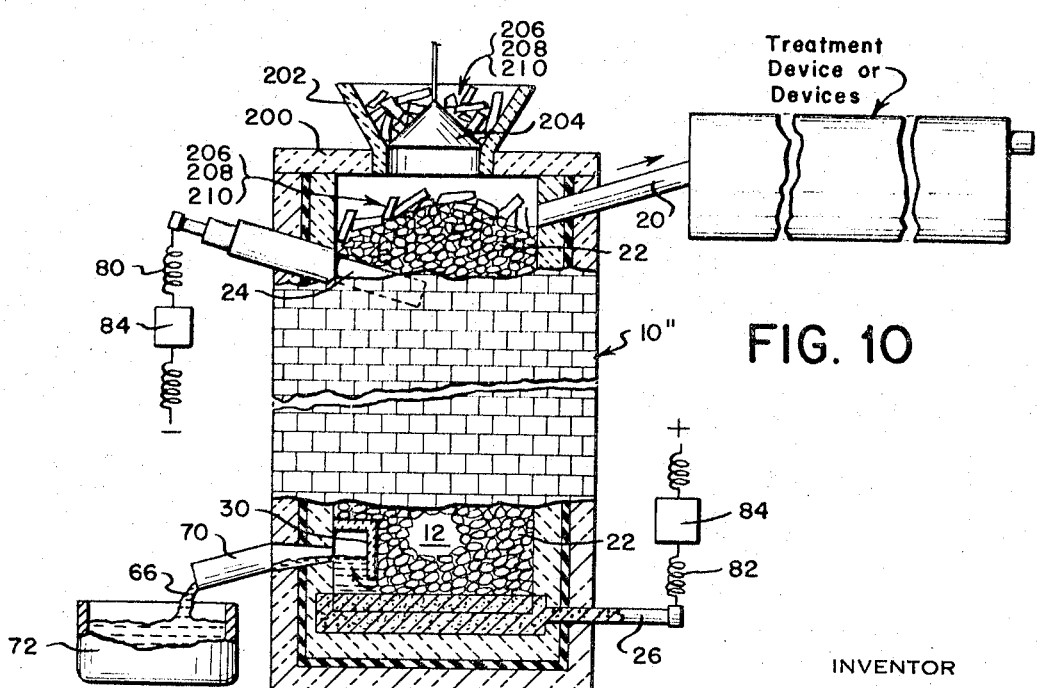
FIG. 10 is a diagrammatic view in elevation, with parts broken away, of an electrothermic furnace of the invention fed with solid pieces of metal.

While the impure metal-to-be-refined may be, and preferably is, when convenient, fed into the electrothermic furnace in molten form, it may also be fed thereto in solid form. Apparatus for such a practice is shown in FIG. 10.

To this end, the center of roof 200 of electrothermic furnace 10" is provided with a charging hopper 202, which is closed, except during charging, by a bell 204. The charging device may be of the well-known conventional type. Finely divided powder, particles, pieces or chunks 206, 208, 210, etc. of the solid impure metal, such as zinc-to-be-refined, is fed intermittently through the hopper onto the sloping top of column 12 of carbon lumps 22. Due to the intense heat generated within the carbon lump column, the pieces of impure metal are melted. The resulting impure molten metal spreads laterally over the cross section of the column and percolates or trickles by gravity downwardly among, and in intimate contact with, the carbon lumps.

As before, the resulting metal (zinc) vapours rise to escape from the upper portion of the electrothermic furnace through vapour outlet 20 into a suitable treating device or devices, such as a condenser, a powder or a metal oxide forming arrangement; or indeed to one or more reflux condensing columns for additional purification. The molten metal residuals 66, on the other hand, escape from the lower portion of the furnace through conduit 70 into collector 72.

So far as the feeding of solid impure metal to the electrothermic furnace is concerned, I am aware that some practical operating difficulties may be encountered. The heat to melt the solid zinc, to bring it up to its boiling point and to evaporate it, means that the heat requirements of the furnace must be increased. Also, there is the danger that if sufficient heat is not available, the whole top portion of the furnace may become blocked by a "plug" of solid zinc metal. Also, there may be a tendency for zinc vapour to condense on the cooler molten metal at the upper portion of the furnace and to run back through the column; although a beneficial refluxing action then takes place. Heating problems may be minimized, at least in part, by pre-heating the impure zinc, for example. To this end the particles or pieces of zinc may be placed in the charging hopper and bell well in advance of their discharge into the electrothermic furnace. Heat from the furnace, above the boiling point of zinc (907° C.), is then employed to pre-heat the charge before it is dumped onto the carbon lump column in the furnace shaft. While the pre-heating step will fall short of the temperature of molten zinc (419° C.), it approaches that temperature; and to that extent facilitates the treatment operation in the carbon lump column.

FIG. 11

As indicated above, the purified, or at least partially purified, metal vapour (such as zinc) coming from the electrothermic furnace may be variously treated, depending upon the final product desired, as well as the quality of that product.

Figure 11:
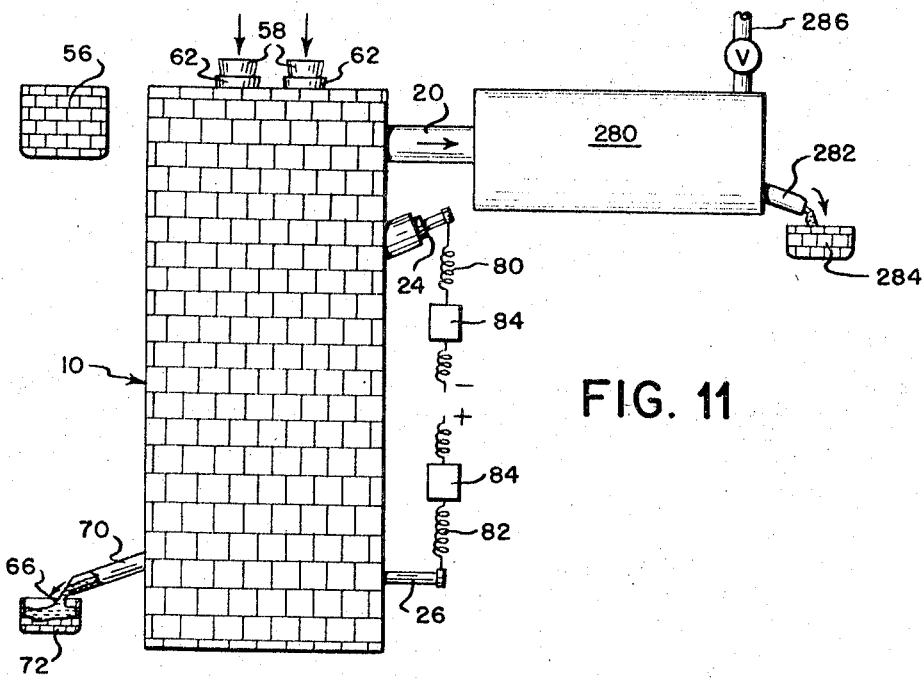

The apparatus shown in FIG. 11 includes an electrothermic furnace 10 (such as that described, the furnace being electrothermically operated in a manner similar to that described above, with regard to FIGS. 1–8). The present embodiment shows zinc vapour outlet 20 communicating with a conventional or other condenser 280. It is provided at its furthermost end with a molten zinc sealed discharge conduit 282 to deposit the condensed molten zinc in a collecting vessel or mold 284. The uppermost part of the condenser is provided with a valved exhause conduit 286 for the escape of any extraneous gases that may be present in the condenser or which may have come over to the condenser from electrothermic furnace 10.

The apparatus is particularly useful in the production of molten zinc which does not contain a substantial amount of metal impurities, such as cadmium, more volatilizable than the zinc itself. On the other hand, metal impurities, such as lead, present in the molten zinc, which are less volatilizable than the zinc, find their way down the column of carbonaceous lumps in the furnace to its bottom. Here the resulting residual zinc 66, mixed with the less volatilizable metals, passes through liquid sealed conduit or trough 70 to a receiving vessel 72.

FIGS. 12–13

To make zinc dust or powder, attention is directed to FIGS. 12–13. It consists of a furnace 10, as above described. The vapour outlet 20 connects with a sheet metal vessel 100 which serves as a main condenser. The sheet metal walls of the vessel readily radiate heat, which helps to cool the interior space and the interior contents of the vessel. Circumferentially and symmetrically placed around the vapour inlet 20 to the condenser are a plurality, preferably four or more, of spaced nozzle or jets 102 through which recycled inert gas is blown at a controlled velocity. These jets are directed obliquely toward each other so that the streamlets of inert gas, which are not substantially hotter than ambient temperature, impinge on and into the stream of zinc vapour issuing from the outlet (inlet) 20 only a short distance, preferably less than two feet, inside the condenser; and thereby break up the incoming stream of zinc vapour into a great multitude of tiny globules or particles of molten zinc, which are instantly and widely dispersed throughout the condenser. The individual particles are instantaneously chilled by the cooler inert gas to a temperature at which substantially all of the zinc vapour is condensed to a solid fine dust. It is important that the nozzles or jets be placed in a position to impinge a plurality of spaced jets of the inert gas symmetrically and circumferentially onto and into the cloud or main stream of zinc vapour entering the condenser through inlet 20.

The upper part of the main condenser 100 is rectangular in cross-section. The lower parts of the two halves of the condenser are tapered to form a pair of hoppers 103 in which most of the zinc dust is collected. These hoppers are sealed at their bottom by removable dust seals 104. Precipitated dust may be withdrawn from the bottoms of the hoppers from time to time. The top of condenser 100 is provided with a plurality of spaced pressure release caps 106.

The furnace gases, still containing zinc dust, leave condenser 100 at a temperature of about 300° C. and enter a forked conduit 108, extending from the top portion of the condenser to a pair of spaced baffled settling tanks 112, the bottom of each tank being in the form of a single hopper with a sealed damper 113 for periodic removal of dust. The tanks are formed of sheet metal to facilitate loss of heat.

A forked conduit 114 connects the tops of the two settling tanks with each other. Each tank is provided with a centrally located depending baffle 118, extending from the top of the tanks to almost the bottom of the tanks, so that the gases and dust passing under the baffles must follow a 180° change in course, as indicated by arrows 120. This causes the gases and dust to impinge upon the baffles as well as the walls of the tanks; and thus helps to precipitate newly formed dust particles onto the bottoms of the settling tanks.

Forked conduit 114 has a branch 122 at its upper end which connects with a polyethylene sleeve or balloon 124; in the form of an expansion chamber, with a non-return valve 128 at its free end. This expansion chamber copes with slight fluctuations of pressure by inflating or deflating, and the whole system can be kept under a small positive pressure of about, for example, 1 inch water gauge.

The second of the two settling tanks 112 is provided with a forked conduit 130 at its upper end, which connects with the top of a third baffled settling tank 134. The bottom portion of the tank is tapered to form a hopper, in turn provided with a sealed damper 135 for periodic removal of zinc dust. Like the other settling tanks, tank 134 is provided with a centrally located depending baffle 136 extending from its top to near its bottom. Gases and dust escaping from the second settling tank 112 pass downwardly and under the baffle 136, through the small space below the baffle, and make a 180° change in course, as indicated by arrow 138. Impingement of the gases and dust against the baffle, and against the side walls of the settling tank accelerates deposition of the dust into the bottom of the tank. As before, the walls of this tank are formed of sheet metal to facilitate loss of heat. The gases in this third settling tank may become cooled to about 150° C.

From this settling tank 134 the gases and remaining suspended dust particles pass through a conduit 140 into a cyclone 142, where more of the fine dust settles and may be removed from the bottom of the cyclone through a sealed damper 143. The gases, still dust laden, pass through a conduit 144, with a damper or valve 146, which connects the top of the cyclone with the bottom of a bag house 148. The bag house contains a plurality of depending spaced long porous filtering bags 150 extending from near the bottom of the bag house to near the top of the bag house. The dust laden gases from the cyclone pass into a relatively deep distributing manifold 152, to the top of which the bottoms of the filtering bags are attached. Collecting bags 153 are attachable to the bottom of the distributing manifold. They catch and retain falling dust particles.

The fine dust particles settle downwardly in and against the filtering bags, as well as in the manifold. The long bags are shaken from time to time to loosen and drop adhering dust particles to and through the manifold below, to collecting bags 153.

The gases escape laterally through the pores of the high filtering bags and leave the top of the bag house through conduit 154. That conduit connects with a power driven fan or variable speed blower 156. A short free ended conduit 158, with a valve 160, connects with the suction side of the fan or blower. The function of the valved conduit is to permit entry of regulated amounts of free air into the system from time to time, as required, to facilitate formation of the dust; as will be described below.

A circulatory main return conduit 164, with a valve 166, extends from the fan or blower to the immediate vicinity of the outlet (inlet) conduit 20 connecting the furnace with condenser 100. The blower is fitted with a by-pass 167 connecting its suction outlet with its pressure outlet, this by-pass having a valve so that the total volume of gas recirculated through the jets (102) may be varied by cycling gas through the fan rather than through line 164.

The circulatory return conduit terminates in the gas discharge or atomizing device 101, of any appropriate design, such as a hollow annular chamber, to receive and distribute relatively cool circulated inert gas to the plurality of circumferentially spaced jet orifices or jets 102 for the discharge of a plurality of small jets of gas obliquely onto and into the stream of metal vapour escaping from outlet (inlet) 20 into condenser 100.

Main return conduit 164 is provided with a number of branches, such as 172, with a valve 174, which connects the upper end of forked conduit 108; thus permitting return of circulated inert gas into condenser 100 and into the first of baffled settling tanks 112. Another branch conduit, such as 176, with a valve 178, makes a direct connection with the top of condenser 100.

Special provision is made for means to purge the system just described of air, to replace the air with inert gas, such as nitrogen (helium, argon), and to keep the entire system under positive pressure, somewhat higher than atmospheric, in order to prevent ingress of outside oxidizing air, and to replace such inert gas as happens to leak from the system with substitute amounts of inert gas.

The means include an open ended conduit 180, with a valve 182, which connects circulatory conduit 164 with the open atmosphere. A source of inert gas, such as nitrogen, not shown, is connectable with a conduit 186, having a valve 188. That conduit in turn connects a supply tank or reservoir with a compressor 196. A conduit 197, with a one-way valve 198, in turn connects the compressor with main return conduit 164, preferably at an acute angle in the direction of flow of circulating gas back to gas discharge device 101.

To start operations the system is first purged of air. As has been pointed out, applicant uses a plurality of feed crucibles 58 and 62 in the top 54 of furnace 10 in such a way as to prevent passage of outside air into the top interior of shaft 12 of the furnace. The run off conduit 28 at the bottom of the furnace is provided with a molten metal seal, so that outside air cannot enter the bottom of the shaft of the furnace.

Valve 160 in open ended conduit 158 is closed to prevent ingress of air to the suction side of the fan or blower 156. However, valve 182 in open ended conduit 180, connecting the pressure side of the fan or blower, is opened to permit the escape of air from the system.

Conduit 186 is suitably connected to the source of nitrogen; valve 188 is opened and nitrogen gas is passed into tank or reservoir 190. Valve 194 in conduit 192 is opened and the gas passes into and through compressor 196; one-way, no-return, valve 198 in conduit 197, of course, being open so that the nitrogen gas may pass freely into main return conduit 164. To this end valve 174 in conduit 172, valve 178 in conduit 176 and valve 166 in main return conduit 164 are opened. This is true also of valve 146 in conduit 144. Dust seals 104, 113, 135 and 143, and pressure release caps 106, however, are kept closed.

As more and more nitrogen gas is forced into the circulatory system by compressor 196, more and more of the air and some nitrogen, necessarily, in the system escape through open ended conduit 180. Depending on the volume of the system, of course, most of the air is soon replaced with nitrogen. The introduction of nitrogen into the system through compressor 196 and the escape of the resulting mixture of air and nitrogen through opened conduit 180 continues until just about all of the air in the system is forced into the open atmosphere. Valve 182 in conduit 180 is then closed. The compressor 196 continues to inject further, but much smaller, amounts of nitrogen into the circulatory system as a whole until the inside pressure is higher than the outside or atmospheric pressure.

Figure 3:
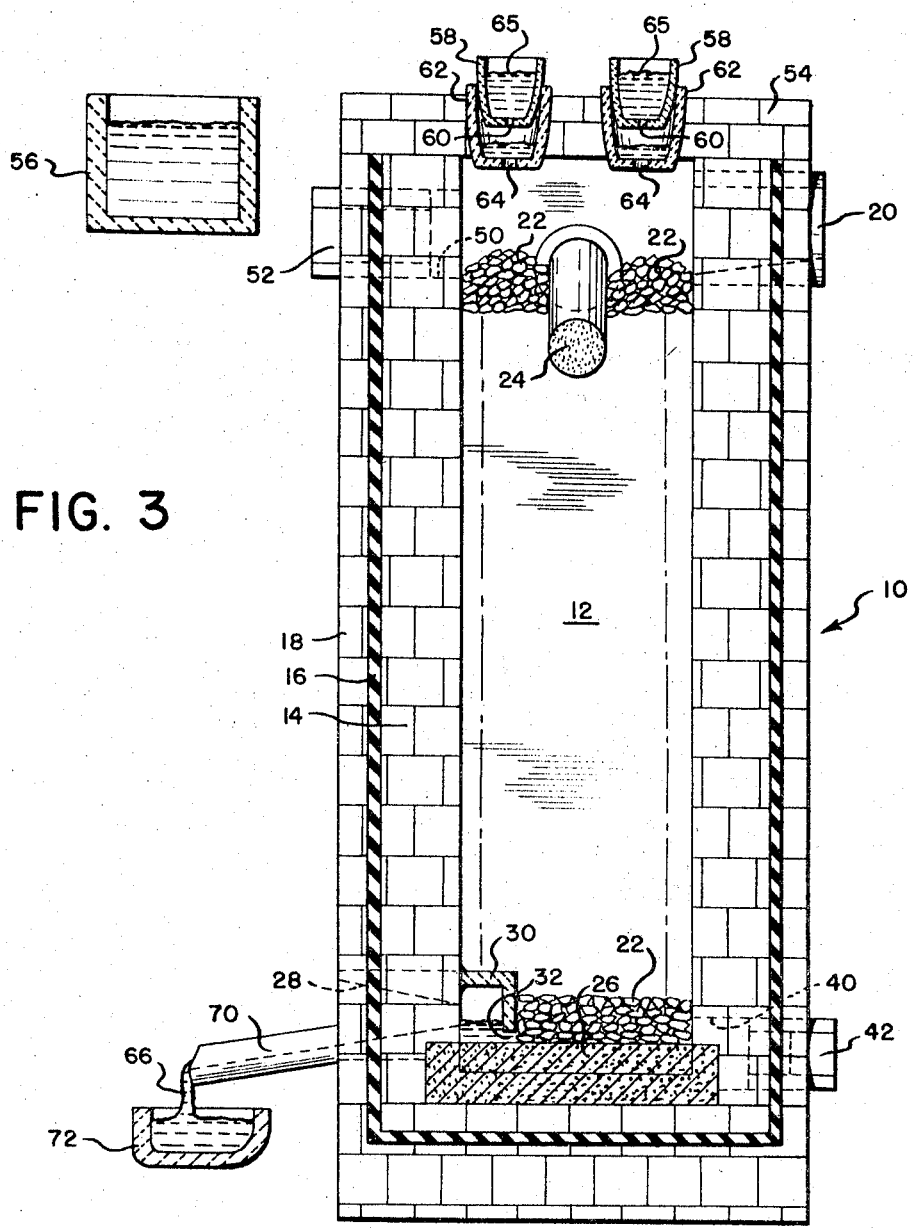
FIG. 3 is a vertical partial section on the line 3—3 of FIG. 2.
Figure 4:
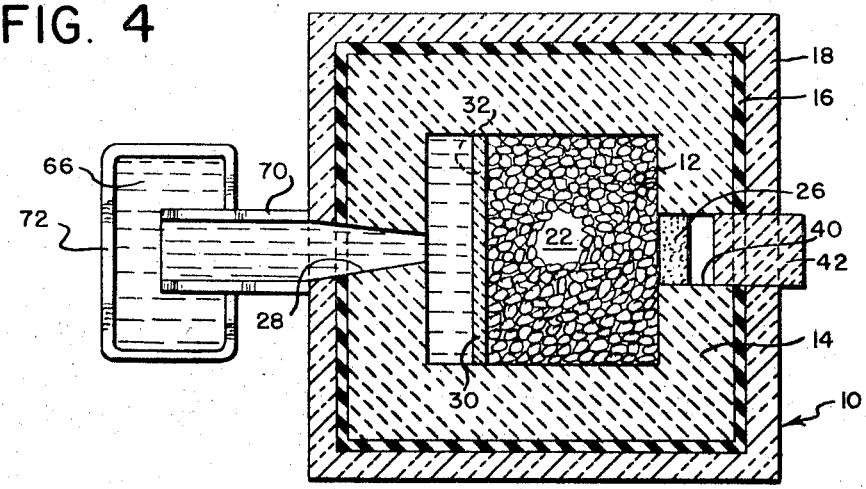
FIG. 4 is a horizontal section on the line 4—4 of FIG. 1.
Figure 5:
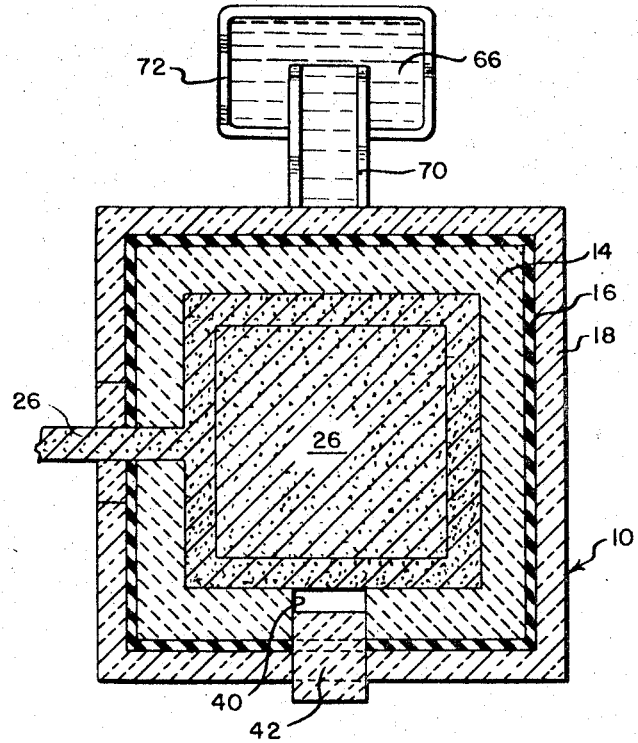
FIG. 5 is a horizontal section on the line 5—5 of FIG. 2.

The column 22 of coke lumps or carbonaceous briquettes in furnace 10 is gradually raised in temperature as electric current is passed through electrodes 24 and 26. Molten zinc from storage pot 56 is passed into all of crucibles 58 at a rate to reach and maintain its liquid level 65 (FIG. 3). As the molten zinc drops through orifices 60 to crucibles 62, and then through orifices 64 onto the top of column 22, the molten zinc spreads laterally and percolates slowly but substantially evenly through the interstices between adjacent lumps of coke in the column. As a result the surfaces of the lumps are wetted in whole or in part by the molten zinc.

Eventually the entire column of coke lumps 22 is treated in this manner. The efficiency of the electrothermic heating continues to rise as this takes place, until the operation becomes steady at a given power input. As indicated above, as the electrothermic heat is supplied directly to the molten zinc metal, the rate at which zinc is vapourized is closely related to the rate of supply of electrical energy. If the rate of supply of electrical energy is maintained constant, the rate of volatilization of zinc can likewise be maintained constant. With a constant rate of supply of molten zinc to the column, a constant ratio of zinc volatilized to zinc run-off from the bottom of the column can be maintained.

In the system just described, compressor 196 and its associated structural elements are shown separate and apart from the main return conduit 164, except for having an inert gas feed line 197 connecting the two. Valve 198 is a one way, no-return, valve so that no gas laden dust can back-up into the compressor. This arrangement protects the compressor.

The main return conduit 164 may, of course, be connected in series with the compressor. To protect the compressor an adequate filter for dust in the return gas conduit is advantageously employed in the circuit before the compressor. Such an arrangement is shown diagrammatically in FIG. 13. It is provided with a filter 165 interposed in main return conduit 164 in advance of compressor 196. The non-return valve 198 is located in feed line 197 connecting main return conduit 164 forward of the compressor. Both filter 165 and no-return valve 198 function to prevent ingress of zinc dust into the compressor, thus protecting the same.

The clean exhaust gas, which is substantially pure nitrogen, is then recirculated through main conduit 164 to jets 102 by means of variable speed blower 156. In general, all the gas is thus circulated, but provision is made also for recirculating some gas through pipe 176, closable by valve 178, into the far end of the main condenser 100, and also to the first of settling tanks 112 through branch conduit 172, closable by valve 174, and forked conduit 108. A valve 166 is also provided in main return conduit 164.

The size of the zinc dust particles produced by this process is directly controlled by controlling the volume of inert gas entering jets 102 through return conduit 164 and its valve 166; the higher the ratio of inert gas to zinc vapour, the finer is the dust produced. When inert gas is circulated through branch conduits 176 and 172, the object is control of the amount of the finer dust kept in suspension so that it can be effectively classified into size ranges in condenser 100, settling tanks 112, 112, and 134.

With the whole circuit run at a pressure slightly greater than atmospheric, the entry of extraneous air is prevented. Owing to the steady rate at which the method of the invention generates zinc vapour electrothermically, a reasonably steady pressure condition can be maintained throughout the condenser system. The polyethylene balloon 124 copes with slight fluctuations of pressure by inflating or deflating, and the whole system can be kept under a small positive pressure of about 1 inch water gauge.

For most of the purposes for which zinc dust is required, such as a component of pigments or a chemical reducing agent, it is necessary that the dust should have a high content of metallic zinc, with only a small amount of zinc oxide. In general, it is required that at least 96% of the zinc should be present in metallic form. By rigorous exclusion of air in the process of this invention, it is possible to produce zinc dust with a metallic-zinc content of about 99%. I have discovered, however, that zinc dust with a metallic-zinc content greater than 98.5% tends to frit and does not flow readily. In order to produce zinc dust containing around 97–98% of metallic zinc, I have therefore found it necessary to introduce a small amount of oxygen into the system. This oxygen is conveniently introduced as air by slightly opening valve 160 in open ended conduit 158 on the suction side of blower 156; this oxygen oxidizes a very small amount of the zinc vapour when it enters main condenser 100 through jets 102.

For certain purposes it is desirable that the zinc dust should contain less than 0.09% lead. When the input zinc to the electrothermic process contains 1.2% lead, zinc dust of this desired purity can be obtained with 10% of the input zinc run off through taphole 28, as lead-rich zinc, from the bottom of the furnace; and 90% of the input zinc is distilled and discharged through outlet 20 near the top of the furnace.

With the input zinc containing 0.15% lead, zinc dust of the desired purity can be obtained with only 3% of the input zinc run off from the bottom of the electrothermic furnace, while the remaining 97% is distilled and discharged through outlet 20.

EXAMPLE 2

As an example of the manufacture of zinc dust according to the invention, zinc vapour was generated as described in Example 1, and zinc dust was produced at the rate of about 600 pounds per hour. Nitrogen gas was circulated at the rate of about 150 cubic feet per minute, all through main conduit 164 to jets 102. Air was introduced through open ended conduit 158 at the rate of about one cubic foot per minute. The zinc dust produced contained 98% metallic zinc. Of this product, 80% was collected in the main condenser 100; and of this 85% was less than 10 microns in size; this material was classified to separate the material of less than 10 microns, by means of an Alpine classifier. The remaining 20% of the zinc dust, deposited in the rest of the condenser system, was substantially all less than 10 microns in size.

FIG. 14

Figure 14:
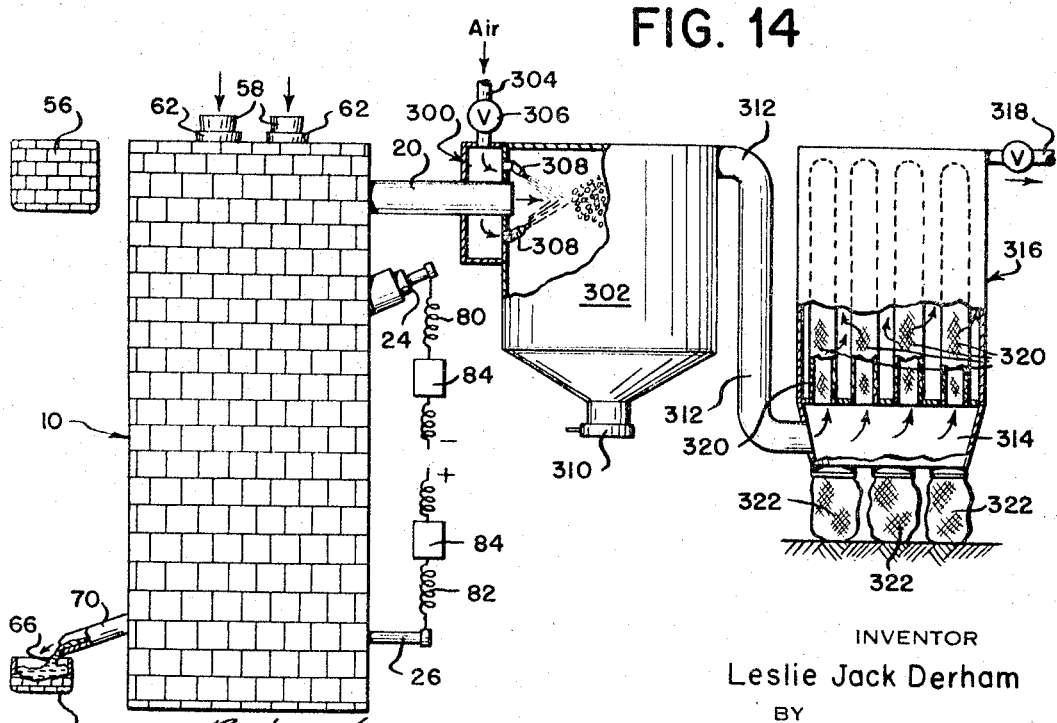

The method and apparatus shown diagrammatically in side elevation in FIG. 14 is particularly useful in the production of zinc oxide pigment and the like. It includes an electrothermic furnace 10, such as heretofore described in the case of FIGS. 1–8. Zinc vapour outlet 20 passes through a hollow annular wind box 300 integrally secured to a chamber, or cyclone, 302. The annular wind box is connected to a compressed air inlet 304, provided with a control valve 306, the same being adapted to force a controlled amount of air into the wind box. The box is provided with a plurality of circumferentially spaced outlet nozzles or jets 308 adapted to eject streamlets of the compressed air obliquely toward and into the stream of zinc vapour passing from the furnace through vapour outlet 20 into chamber, or cyclone, 302.

Chamber, or cyclone, 302 is of the conventional type. In this case it is filled with excess air forced therein under pressure. There is a good deal of agitation and mixing of the resulting zinc oxide pigment, resulting from the reaction between the jets or streamlets of air and the relatively larger main stream of zinc vapour issuing from and circulation of the newly formed zinc oxide particles in the chamber, or cyclone, they are impinged upon its side walls. The heavier particles of zinc oxide are dropped gradually to, and collect at, the bottom of the chamber; which is provided with a damper 310, for the removal of collected zinc oxide.

The upper part of the chamber or cyclone is provided with an outlet conduit 312 extending downwardly to and connecting with a distributing manifold 314 at the bottom lower portion of a bag house 316. The upper and remote portion of the bag hourse is provided with a valved exhaust conduit 318 for the escape of gases passing through the system to the outside atmosphere.

As zinc oxide particles and furnace gases rise upwardly in elongated bags 320, the solid zinc oxide particles separate from the furnace gases and fall by gravity toward the bottom of the bags. The furnace gases on the other hand escape through the porous walls of the elongated bags and find their way through exhaust conduit 318.

The zinc oxide pigment which settles to the bottom of the bags and into the distributing manifold is dropped by gravity into collecting bags 322.

Metal impurities present in the molten zinc in storage pot 56 poured into furnace 10 are processed as heretofore described. Those metal impurities which are more volatile than zinc, such as cadmium, find their way into chamber 302 and hence into the zinc oxide pigment. Such product is, nevertheless, highly useful. Those metal impurities present in the molten zinc which are less volitile than zinc, such as lead, zinc with a small amount of the zinc to the bottom of the column of carbonaceous lumps. The resultant molten zinc residual 66 is tapped through liquid sealed trough 70 into received or collecting vessel 72.

FIGS. 15–18

Referring next to FIGS. 15, 16, 17 and 18, they show the combination of three electrothermic furnaces, 10''' (10-three prime), 10'''' (10-four prime) and 10''''' (10-five prime), each having a reflux column mounted on the top thereof, with a zinc vapour condenser connecting the top of the first reflux column with the top of the second electrothermic furnace and a cadmium condensing canister (or condenser) connecting the top of the second reflux column.

Figure 15:
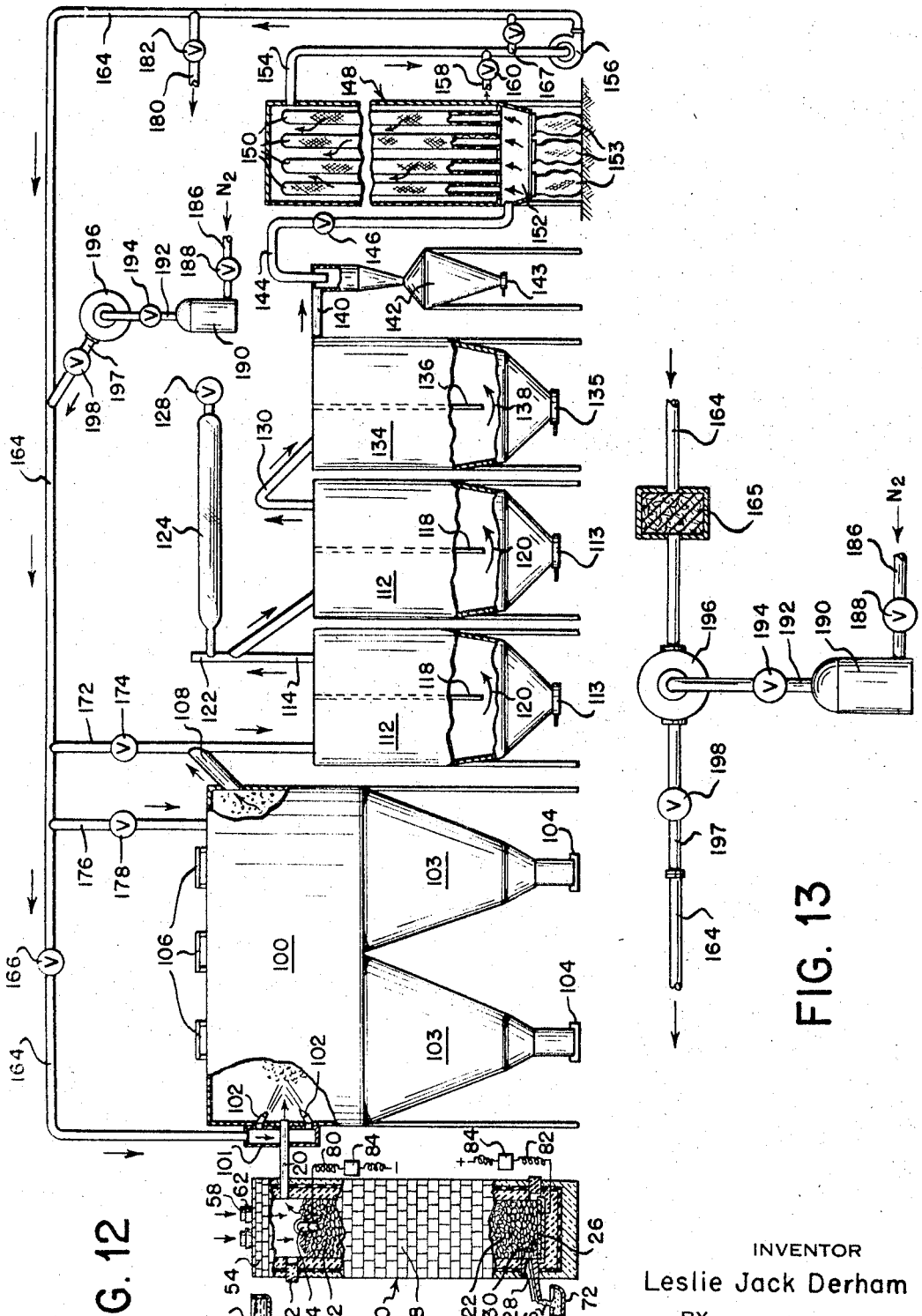
FIG. 15 is a sectional elevation of an electrothermic furnace, showing a first as well as a second reflux condensing column, with a condenser interposed between and connecting them, and a canister (or condenser) for cadmium and the like connecting the top portion of the second reflux column.
Figure 16:
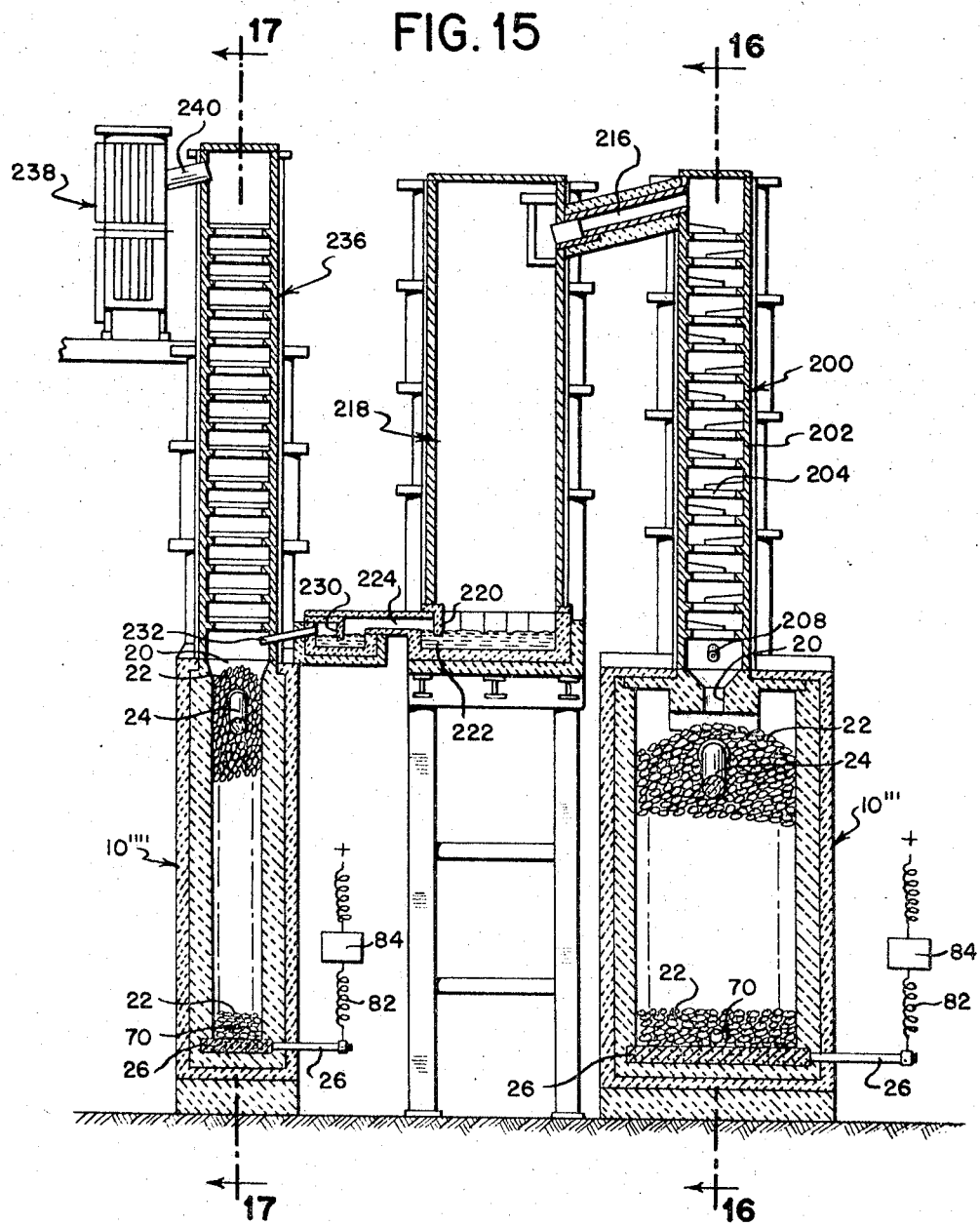
FIG. 16 is a vertical section on line 16—16 of FIG. 15.
Figure 17:
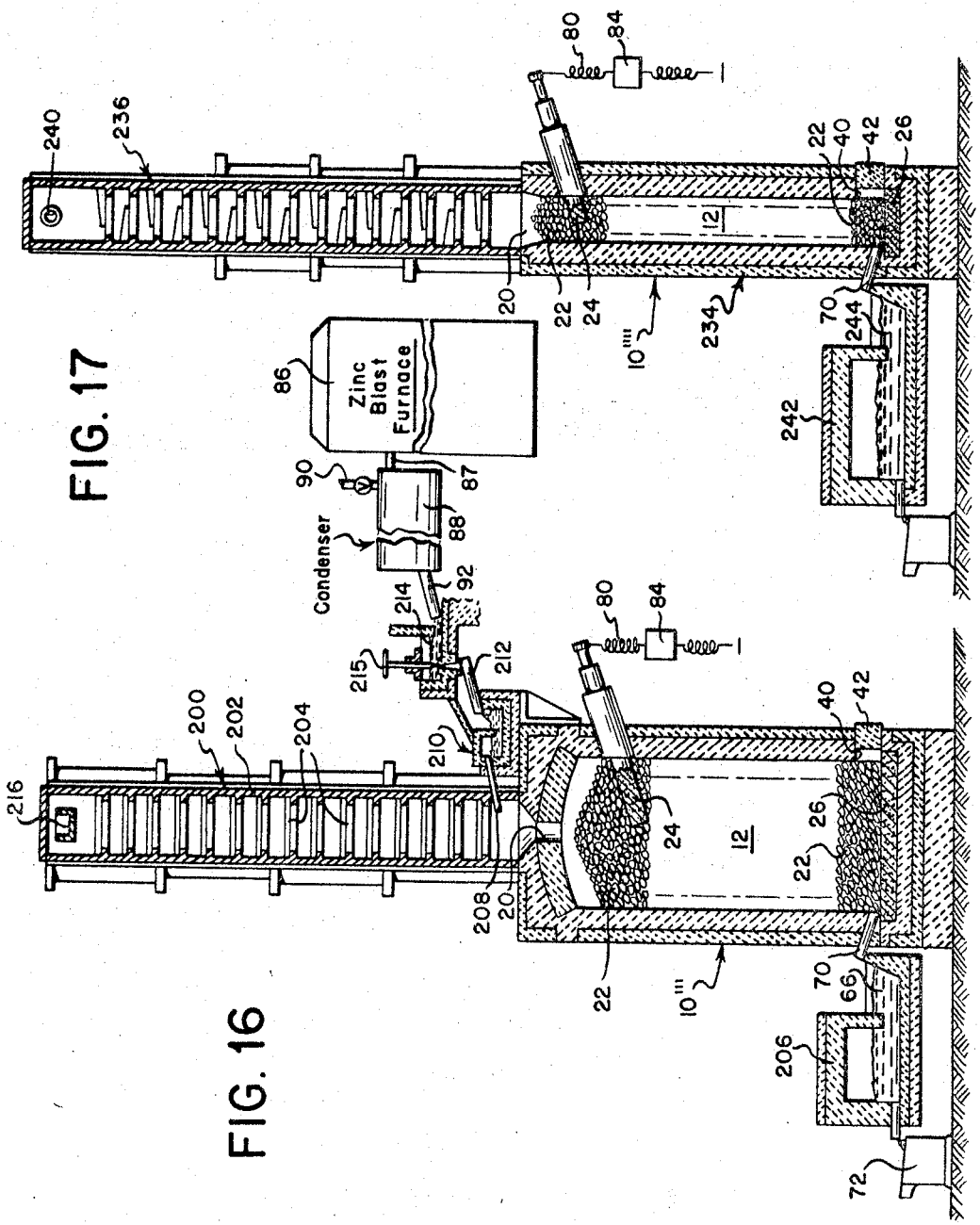
FIG. 17 is a sectional elevation on the line 17—17 of FIG. 15.

In the case of FIGS. 15 and 16, the apparatus shown comprises an electrothermic furnace 10''' (10-three prime), substantially like that shown in FIGS. 1–8, except that the means employed to charge impure molten zinc thereto is somewhat different. A first lead reflux column 200 is mounted centrally on the top of the furnace, directly above outlet 20, for the passage of vapourized zinc and its more volatilizable metal impurities, such as cadmium. The refluxing column is formed of Carborundum brick 202 with clay trays 204. At the bottom of the furnace is a holding bath and vapor seal 206. At the top of the furnace is a feeding arrangement for impure molten metal comprising a tube 208 leading into the top of the furnace, directly above vapour outlet 20; a holding bath and vapour seal 210 for feeding the tube 208; a covered trough 212 for feeding a holding bath and vapour seal 210; a supply bath 214; and a control valve 215 for regulating the amount of molten metal going through feeding trough 212.

As in the case of FIG. 9, FIG. 16 shows the (optional) use of a zinc blast furnace (or other smelting furnace) 86 with a zinc vapour outlet 87 in its upper portion connecting a condenser 88, such as its lead-splash condenser system, for the accumulation of a source body of molten zinc 214. The condenser is provided with a valve escape conduit 90; and a molten zinc under flow conduit 92, the discharge end of which connects with supply bath 214.

The top of lead refluxing column 200 connects by means of a downwardly inclined conduit 216 (FIG. 15) with a condenser 218 of Carborundum bricks. The bottom of the condenser is provided with an offset depending baffle 220, partially submerged, to provide a narrow passageway 222 for the movement thereunder of condensed molten metal, which then rises to closed conduit 224. A molten metal seal is provided in this manner which prevents ingress of outside air into the condenser and hence into the lead refluxing column and electrothermic furnace preceding it.

Trough 224 extends over to and connects a holding bath and vapour seal 230, which in turn feeds a conduit 232 inclined downwardly into the top of a second electrothermic furnace 10'''' (10-four prime) built substantially similar to the electrothermic furnace 10 of FIGS. 1–8.

A second refluxing column 236 (FIGS. 15 and 17), similar to the first lead refluxing column 200, is mounted on the top of electrothermic furnace 10'''' (10-four prime), and at its top connects a cadmium condensing canister 238 by means of a connecting conduit 240 running from the top of the second refluxing column, the same being inclined downwardly toward and entering the upper portion of the canister. Cadmium canister 238 may well be a condenser and the condensed cadmium-zinc may be further distilled in a separate small electrothermic furnace surmounted by a high reflux column. In this way cadmium of, say, 99% purity may be removed from the top of the column.

The bottom of furnace 10'''' (10-four prime) (FIG. 17) connects with a holding bath and vapour seal 242; the same being filled with molten metal 244.

In operation a molten zinc metal feed at valve 215 (FIG. 16) may consist of zinc containing 1–2% lead, 0.05–0.03% cadmium and 0.02–0.03% iron, with traces of other impurities, as derived, for example, from a lead splash condenser used in conjunction with a zinc blast furnace.

The furnace 10''' (10-three prime; FIG. 16) contains some 80% of the zinc, including the lead. The zinc is boiled off via reflux condenser 200 to give a condensate in condenser 218 (FIG. 15) containing 0.003% lead and 0.06 to 0.35% cadmium.

The residual 20% molten zinc 66 reaching the bottom of furnace 10''' (10-three prime) contains 6% lead; and, after liquating and running off the surplus lead, it will be of G.O.B. (Prime Western) standard but cadmium free.

The cooling at the top of the reflux column 236 is so controlled that most of the zinc vapour is recondensed and only a small fraction (4–10% of the total) escapes into the canister 238, where it is condensed, either as a dust or as molten metal, containing 1.5 to 10% cadmium. If a dust is collected it can be leached to recover the cadmium. If it is collected as molten metal, it can be refluxed again to separate the zinc and cadmium.

The remaining 90%–96% molten zinc 244 (FIG. 17) leaving the bottom of furnace 10'''' (10-four prime) will contain 0.003% lead, 0.003% cadmium and 0.001% iron.

As an embodiment, in place of trays 204 (FIG. 16) inclined silicon carbide overlapping tiles, projecting from alternate opposite walls, may be used.

The method and apparatus just described are capable of producing high purity zinc metal, even though starting out with an impure molten zinc containing a relatively large amount of impurities, such as lead and cadmium, some of which are less volatilizable than zinc and some of which are more volatilizable than zinc. The invention has been described more particularly in respect of zinc containing such impurities as lead, which is less volatilizable than zinc, and such impurities as cadmium, which is more volatilizable than zinc.

Figure 18:
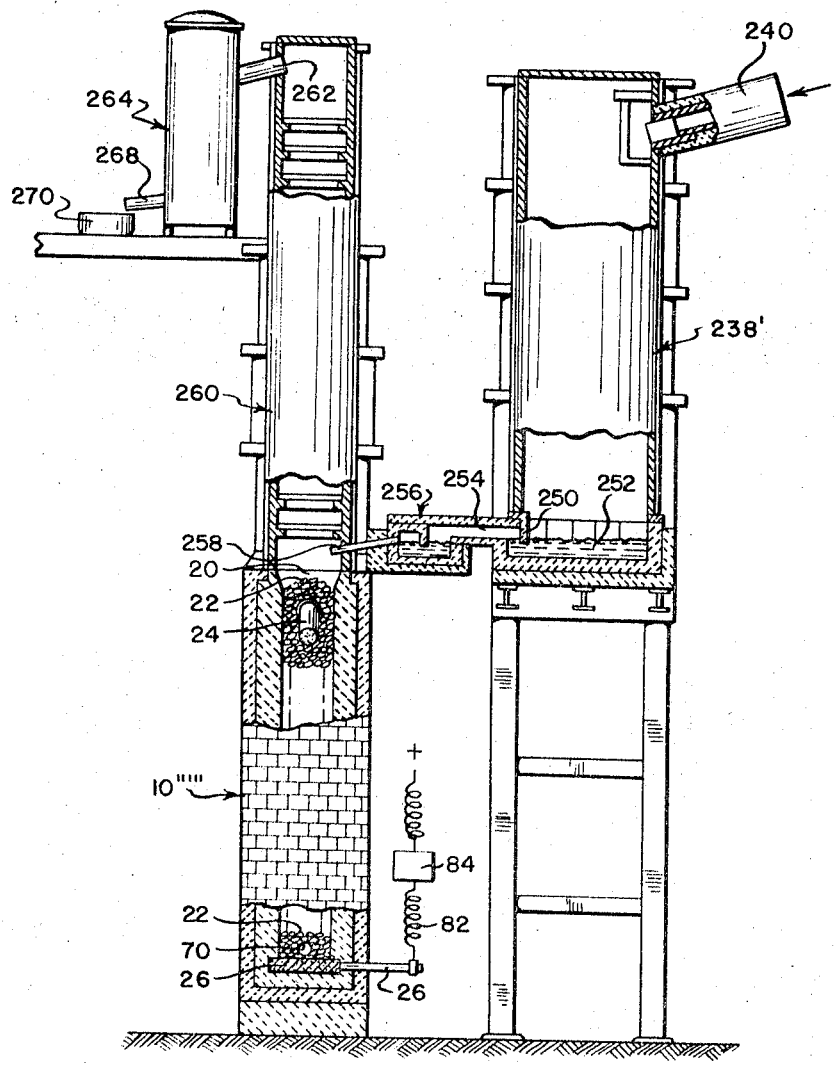
FIG. 18 is an elevation, partly in section, of an extension of FIG. 15, showing the substitution of a zinc cadmium condenser and refluxing column for the cadmium canister (or condenser) of FIG. 15.

It is stated above, in connection with FIG. 15, that cadmium canister 238 may well be a condenser and that the condensed cadmium-zinc may be further refined in a separate electrothermic furnace surmounted by a long reflux column; and that in this way cadmium of, say, 99% purity may be removed from the top of the reflux column. FIG. 18 illustrates such an arrangement.

Referring to the right side of FIG. 18, it will be noted that vapour conduit 240, which connects with the upper portion of reflux column 236 (see FIG. 15), connects in turn at its discharge end with a condenser 238'. The condenser may be of conventional design, such as described above. Its lower portion is provided with a partially submerged baffle 250. Cadmium rich molten metal 252 collects in the bottom of the condenser, and passes under the baffle into a closed conduit 254 to a vapour seal supply bath 256. An inclined conduit 258 connects the supply bath with the top portion of an electrothermic furnace 10''''' (10-five prime), substantially like those heretofore described. It is packed with carbon lumps 22 and is heated by means of graphite electrodes 24 and 26.

A refluxing column 260 extends vertically from the top of the electrothermic furnace. Metal vapours rich in cadmium, such as cadmium-zinc, rise in the column and are subjected to reflux condensation. As a result any metal vapour, such as zinc, with a higher boiling point than cadmium gradually finds its way down the reflux column as a condensate to the bottom of the electrothermic furnace; and thence through conduit 70 as molten residual metal.

The cadmium rich vapour, on the other hand, passes through vapour conduit 262 at the upper end portion of the reflux column into a cadmium condenser 264. There the highly purified cadmium accumulates in molten form and is discharged through outlet conduit 268 into a receiving vessel 270; which advantageously is in the form of a mold, so that the molten high purity cadmium may be cast directly into anodes for electrolytic plating.

In view of the disclosures thus far, it will be clear to those skilled in this art that the apparatus of FIGS. 15–18 lends itself to a number of highly useful modifications. In the case of FIGS. 15 and 16, for example, vapour conduit 216 may be considered the equivalent of vapour conduit 20 in some of the preceding figures, such as FIGS. 1, 3 and 6, not to overlook FIGS. 9, 10, 11, 12 and 14. That is to say, vapour conduit 216 of FIGS. 15 and 16 may be connected to various treatment devices, such as those broadly referred to in FIGS. 9 and 10, and those referred to specifically in FIGS. 11, 12, 13, 14 and 20, to make various metal products, such as the metal itself, molten or solid, metal dust or powder, or metal oxide, etc.

Such arrangements are possible as they are with vapour conduit 240 (FIGS. 15 and 17) and vapour conduit 262 (FIG. 18). It is possible also with molten metal conduits 224 and 254 (FIGS. 15 and 18).

FIGS. 19–20

Figure 19:
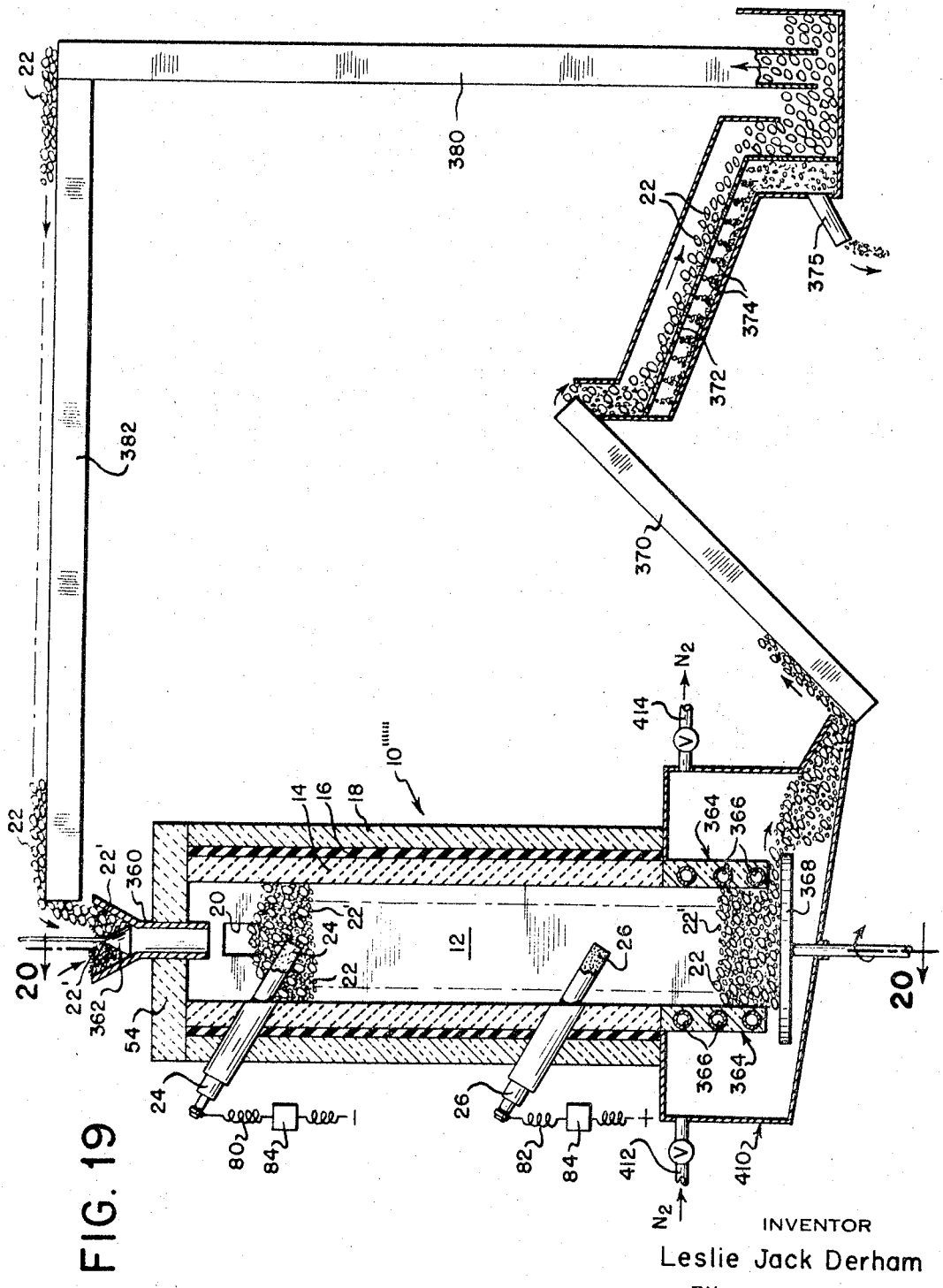
FIG. 19 is a diagrammatic side elevation, partly in section, of yet another apparatus, illustrative of a practice of the invention, particularly useful for the separation of one or more metallic constituents from an alloy of metals.
Figure 20:
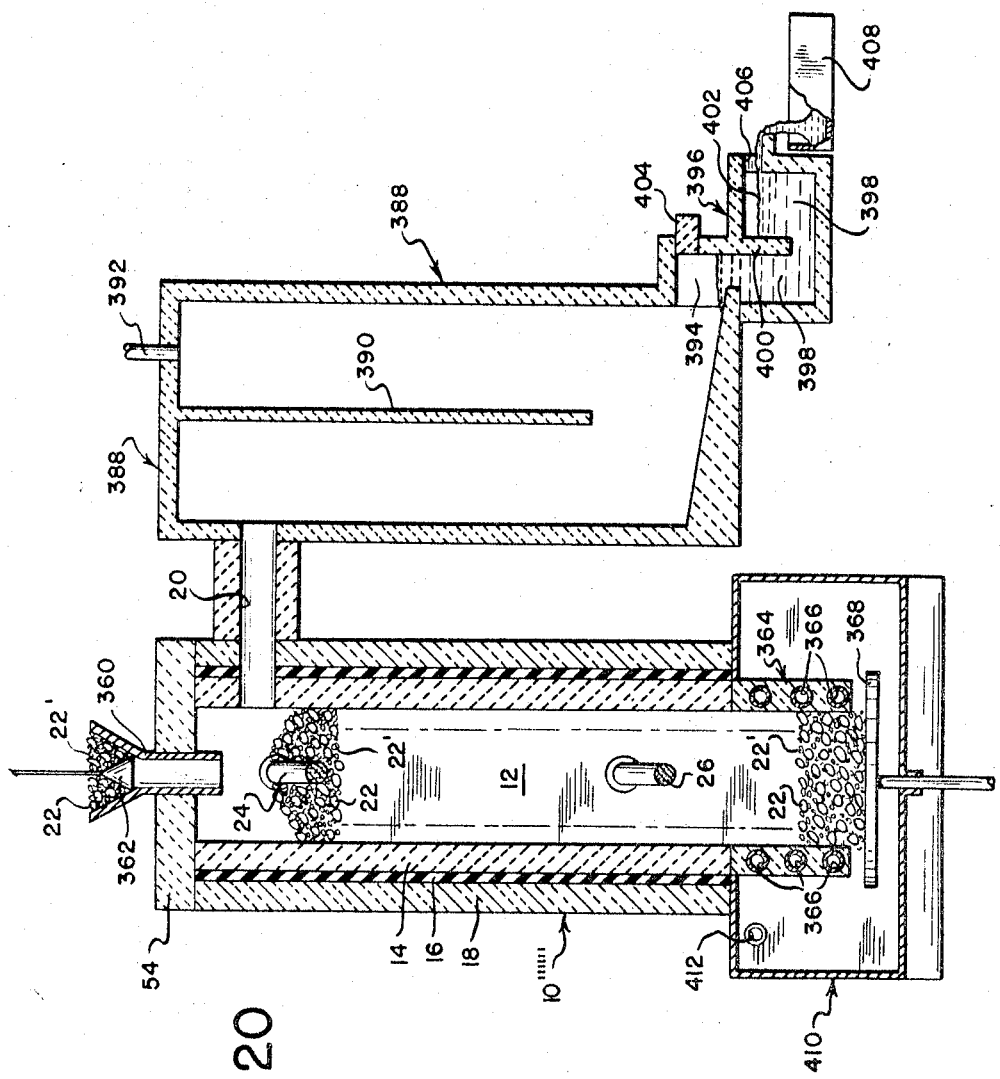
FIG. 20 is a sectional elevation of line 20—20 of FIG. 19.

Another variant of the invention is disclosed in FIGS. 19 and 20. As indicated above, the invention likewise relates to the production of relatively pure zinc vapour from secondary metallic, such as zinciferous, materials containing other metals. One example of such a zinciferous material is zinc-iron alloy, commonly known as "hard metal," that is recovered from the bottom of galvanizing pots. Other examples of such zinciferous materials are the brass-type alloys in which the main component, apart from zinc, is aluminum. Still other examples are the alloys zinc-tin, zinc-copper, zinc-manganeses, zinc-nickel, etc.

While zinc alloys have been mentioned, and while the discussion of the invention to follow will again lay emphasis on zinc, the practice of the invention is applicable to other metal alloys; particularly such relatively volatilizable metals as have been mentioned above, such as cadmium, lead, antimony, and mercury.

Among the cadmium alloys are the bearing metals, such as: cadmium-nickel (Cd-Ni), cadmium-silver (Cd-Ag), cadmium-copper (Cd-Cu), etc. Among the lead alloys are: lead-silver (Pb-Ag), lead-tin (Pb-Sn), lead-mercury (Pb-Hg), etc. Among the tin alloys are: antimony-silver (metal argentum-Sb-Ag), antimony-tin (Ashbury metal-Sb-Sn), antimony-mercury (amalgam), etc. And among the mercury alloys are a long series of amalgams, such as those with tin, arsenic, bismuth, cadmium, magnesium, potassium, silver, sodium, tellurium, zinc, lead, etc.

In the process of this invention, the zinc alloy is first powdered by heating it to its hot-short temperature range, not far below its melting point. The resulting metallic powder is then briquetted with wet or damp clay as a binding agent, together with a small amount of a carbonaceous material, such as anthracite coal. The metal-containing briquettes 22' thus produced, are then heated to drive off their moisture and hydracarbons. The resulting indurated briquettes, together with lumps of coke, or carbonaceous briquettes, etc., 22 are then intermingled and introduced into an electrothermic furnace similar to that described above, where the zinc is distilled off.

The column is heated electrothermically to a temperature sufficiently high, first, to melt the metal to be recovered and then to distil the molten metal-to-be-recovered, but to a temperature sufficiently low to retain the metal of higher boiling point in unvapourized form.

The resulting molten metal percolates from the interior of the briquettes and covers at least in part both the metal-containing briquettes and the carbon lumps, thus increasing the efficiency of the flow of electrical current through the metal-containing briquettes and the coke lumps. Also, the presence of carbon, anthracite fines, and metal in the briquettes make a more efficient conductor for the passage of current through the briquettes.

The zinc vapour thus produced may be conducted to a condenser where it is condensed to give molten zinc. The zinc vapour may also be conducted to a condenser where cooling conditions are so controlled that the zinc is condensed as a dust. Again, the zinc vapour may be mixed with air to produce zinc oxide. The invention will, at the moment, be exemplified for the production of molten zinc.

The furnace 10′′′′′′ (10-six prime) in which the zinc is volatilized consists essentially of a shaft 12 with an inner layer 14 of heat-insulating refractory brick, an intermediate layer 16 of mica to provide electrical insulation, and an outer layer 18 of highly insulating refractory brick; there is an outlet 20 in the upper portion of the shaft for the passage of zinc vapour. A column 22–22′ of charge materials is introduced into the furnace shaft. Near the top of the furnace a carbon electrode 24 extends through the side of the shaft, and a similar carbon electrode 26 extends near the bottom of the furnace. Both electrodes penetrate deeply into the column of charge materials 22–22′ to assure adequate contact therewith.

The charge 22–22′ consists, by volume, of about two parts of lump coke to one part of metal-containing briquettes 22′. The coke 22 lumps are about 2 inches in size and the metal-containing briquettes 1 inch. The coke lumps are used to provide a suitable refractory electrically conductive material. The coke is not consumed in any reducing reactions and is recovered unchanged, and re-used.

In the center of roof 54 of the furnace is fitted a charging hopper 360, which is closed, except during charging, by a bell 362. The charge level in the furnace is kept above upper electrode 24. As the charge descends the furnace, the zinc is distilled off by the electrothermically generated heat flowing through the charge, and the rate of through-put of charge is controlled so that, by the time the metal-containing briquettes have reached the lower electrode 26, they are substantially free from zinc. The mixture of coke lumps and zinc-free metal-containing briquettes then descends through a cooling chamber 364, formed by a water-jacket 366. A revolving platform 368, located a short distance below the lower end of the water-jacket, is used to remove the spent charge, which is then transferred by a conveyor 370 onto an inclined screen 372. The small metal-containing briquettes 374 pass through the screen and from the system through a downwardly inclined discharge trough 375. The coarse coke lumps 22 are transported by conveyers 380 and 382 into charging hopper 360, to be passed once again to the furnace, together with more metal-containing briquettes.

The briquettes are made by pulverising and fragmenting the solid lumps of alloy as described above, and mixing the particulate metal with wet clay, forming the plastic mass into shaped bodies (briquettes) and drying these before feeding them to the furnace. The separation of briquettes and coke lumps is achieved by making the briquettes and the coke lumps of different size ranges to start with. Thus, the briquettes will normally be of a substantially smaller size range than the coke lumps.

A great deal depends upon the manner in which the metal-containing briquettes are formed, their ingredients, the manner in which they are treated before use, and the like. If the metal-containing briquettes fed to the furnace are essentially green and weak, not indurated and strong, they tend to disintegrate rather easily as they are mixed and rubbed against the larger and stronger coke lumps, and are passed downwardly through the furnace and are subsequently handled.

The zinc vapour (FIG. 20) passes through the refractory outlet pipe 20, near the top of a condenser 388 constructed of refractory material, such as silicon carbide. This condenser is fitted with a depending baffle 390, extending from the midsection of the roof of the condenser to a short distance from the downwardly inclining bottom of the condenser. In the condenser roof at the far end there is a small vent 392 for preventing undesirable build-up of pressure in the condenser, and for the escape to the atmosphere of any exhaust gases coming from the furnace. A passageway 394 connects the bottom of the condenser with a sump 396 for collecting the condensed metal. A liquid seal formed of purified molten zinc 398, that prevents air from entering the condenser, is provided by a baffle 400 which dips below the normal level 402 of the body of molten zinc 398 in the sump. A cleanout port, with a removal brick 404, is provided in baffle 400. The purified molten zinc 398 may be tapped periodically for casting into slabs or ingots through a taphole 406 into mold 408.

Special provision is advantageously made to prevent ingress of outside air into shaft 12. Such air is objectionable because it is oxidizing; carbon in the charge would be consumed; molten and vapourized metals would be oxidized; the condenser would become clogged with metal oxides, etc. To prevent such undesirable consequences, the lower end or discharge zone of the electrothermic furnace 10′′ is advantageously enveloped in a substantially air-tight metal casing 410. A valved inlet 412 connects the casing with a source of compressed inert nitrogen gas (not shown). A valved outlet 414 connects the casing with the outside atmosphere.

Nitrogen gas under pressure is forced through conduit 412 into casing 410. By suitable control of the valves in inlet 412 and outlet 414, the discharge zone is maintained at a pressure just above that prevailing in the furnace. Some of the inert gas escapes unavoidably to the outside air, but such lost gas is continuously replaced by new gas entering the casing.

It is stated above that the invention is particularly applicable to the treatment of zinc-iron alloy. The, or at least most of the, zinc is volatilized and passed through outlet (inlet) 20 into condenser 388. Since the iron (melting point 1535° C.-boiling point 3000° C.) is much less volatile than the zinc it remains behind as such in the charge. That iron, and a very small amount of the total zinc, remains in the metal (iron)-containing briquettes; and is discarded with the spent zinc-free iron-containing briquettes 374 passed through screen 372 (FIG. 19) and discharge trough 375. The purified zinc 398 is separately recovered, as just described above, in receptacle or mold 408.

It is also stated above that the invention is applicable in the treatment of zinc-aluminum alloy. As before, the zinc, or at least most of the zinc, is volatilized and passed through outlet (inlet) 20 into condenser 388. Since the aluminum (melting point almost 660° C.-boiling point 2057° C.) is much less volatile than the zinc, it remains behind as such in the charge. That aluminum, and a very small amount of the total zinc, remains in the metal (aluminum)-containing briquettes; and is discarded with the spent zinc-free aluminum-containing briquettes passed through screen 372 (FIG. 19) and discharge trough 375. The purified zinc 398 is separately recovered, as just described above, in receptacle or mold 408.

In respect of other zinc alloying metals, such as tin, copper, manganese and nickel, mentioned above, it is pertinent to note their respective melting and boiling points: tin, 232° C. and 2260° C.; copper, 1083° C. and 2595° C.; manganese, 1220° C. and 2152° C.; and nickel, 1455° C. and 2730° C. So far as boiling points are concerned, they are all substantially higher than that of zinc, 907° C.; so that each of the alloys is amenable to the practice of the invention, so far as the recovery of purified zinc is concerned. All of the alloying metals, except tin (232° C.), has a melting point substantially higher than that of zinc (419° C.). In the case of tin, it will melt while the zinc is being vapourized, and flow toward the bottom of the column of charge materials. However, when the molten tin reaches cooling chamber 364, it will solidify. Some of it will be deposited on the spent metal-containing briquettes; both of which are screened out by screen 372. Some of the molten tin will be deposited on the coke lumps and be returned to the furnace, where it can do no harm because the zinc in the metal-containing briquettes is, nevertheless, readily volatilized therefrom.

FIG. 21

As indicated above, FIG. 21 is in the nature of a composite diagrammatic representation, somewhat like a flow sheet, of the apparatus of FIGS. 1–20, and the manner in which that apparatus may be operated in the practice of the invention.

No matter which form of electrothermic furnace is employed, FIG. 21 indicates that outlet vapour conduit 20 (FIGS. 1, 3, 7, 8, 9, 10, 11, 12, 14, 15, 16, 19, 20), 216 (FIGS. 15, 16), 240 (FIGS. 17, 18), and 262 (FIG. 18) is used. The vapour treating device or devices disclosed may be connected therewith to produce any of the desired metal products. To this end the reflux condensation column or columns, for example, may or may not be utilized, as desired. Thus, for refluxing one may look to FIGS. 15, 16, 17 and 18; for producing molten metal to FIGS. 9, 10, 11, 15, 18 and 20; for producing metals powder or dust to FIGS. 9, 10, 12 and 13; and for metal oxide to FIGS. 9, 10 and 14.

While the zinc vapour is described above as being condensed into molten zinc, and the molten zinc as being cast into slabs or ingots, as shown in FIGS. 15–18, and the cadmium cast into anodes, as shown in FIG. 18, the molten zinc may be cast also into slabs or ingots as shown, for example, in FIGS. 1–8, and 9–11. In the case of FIGS. 1–11, the initial condensate of zinc and cadmium, containing substantially all of the cadmium, may be withdrawn and treated, if desired, to separate the two metals, for example, as shown in FIGS. 15–18, particularly FIG. 18. The resulting condensate will be substantially purified molten zinc, which may then be treated as desired to form zinc slabs or ingots, zinc dust or powder, or zinc oxide.

On the other hand, the zinc vapour passing through outlet 20 may be converted also into zinc dust or powder, as described, for example, in conjunction with FIGS. 12–13. The zinc vapour may be converted likewise into zinc oxide as described, for example, in conjunction with FIG. 14.

While the discussion thus far has centered mostly on the purification of zinc, as also indicated above, the practice of the invention lends itself to the purification, or at least partial purification, of other metals; a number of them being mentioned.

In the case of lead most of which is obtained commercially by the blast furnace smelting of galena, PbS, the resulting lead bullion usually contains such metal impurities as silver, gold, copper, iron, antimony, nickel, cobalt, arsenic, tin, bismuth, sulphur, cadmium and principally zinc. Before the silver and gold are retrieved, the lead bullion is suitably subjected to one or more refining operations.

The present invention is advantageously employed at least as a preliminary refining step. As in the case of zinc, the impure molten lead bullion is poured into and through, for example, the apparatus of FIGS. 1–8. The more volatile metal impurities, such as zinc and cadmium, are readily distilled, and passed through outlet 20, when furnace 10 is brought to a temperature sufficiently high to boil off the zinc; and to melt the silver and gold. The boiling point of zinc is 907° C.; of cadmium 778° C.

The temperature selected is, of course, well above the melting point, 327° C., of the lead; as well as above that of silver, 961° C.; of gold, 1063° C.; of copper, 1083° C.; of tin, 232° C.; of antimony, 631° C.; and of bimuth, 271° C. Since these metals are all molten, they will seep to the bottom of column 22 where they are withdrawn; and subsequently are subjected to further refining, with which the present invention is not concerned. The high melting point metal impurities, such as iron, nickel and cobalt, tend to cling to the coke lumps of charge 22 and remain behind.

By heating furnace 10 to a temperature above, but in the vicinity of, the boiling point, 1750° C., of the lead, the lead may be distilled off with the other more readily volatilizable metals, such as zinc and cadmium. In this case, the molten metal withdrawn from the bottom of the furnace is a lead residual of silver and gold. However, pushing the temperature above, but in the vicinity of, the boiling point of lead would place an undue burden on the furnace with present-day readily available materials, so far as wear and tear are concerned. It is conceivable, however, that furnaces adequate to the practice may soon be practical and economical.

The first expedient, that of distilling the metal impurities more volatilizable than lead, yields a valuable by-product, especially the zinc and even the cadmium when those metals are present in substantial quantities in the lead ore. They be treated, of course, in the apparatus of FIGS. 12–13 to produce zinc dust or powder; or in the apparatus of FIGS. 15–18 to eliminate lead and cadmium, to collect a zinc residual of lead, to collect the cadmium separately, and to recover high purity zinc; or in the apparatus of FIGS. 1–11 to produce slab zinc or ingots; or in the appartus of FIGS. 9, 10 and 14 to produce zinc oxide pigment; or in the apparatus of FIGS. 1–11 and 15-17 to produce slab zinc or ingots.

In the case of cadmium, which is a by-product of zinc, lead and copper smelting, the object is, of course, to separate the cadmium not only from those metals but from the metal impurities that accompany those metals—zinc, lead and copper.

The purification, or partial purification, of zinc (and lead) to a certain extent has been described in some detail, more especially as it concerns cadmium. Impure molten zinc is (and impure molten lead bullion may be) treated in the appartus of FIGS. 1–8. In the case of zinc, furnace 10 is preferably heated to a temperature sufficiently high, above but in the vicinity of the boiling point 907° C. of zinc, to volatilize the zinc together with any more volatilizable metal impurities, and to pass the resulting metal vapours through outlet 20; although the temperature of the furnace may be held above the melting point 419° C. but below the boiling point 907° C. of the zinc, and above the boiling point 778° C. of the cadmium, to distil the cadmium while the molten zinc percolates to, and is removed from, the bottom of the furnace.

In the case of lead, the temperature of the furnace is kept preferably above the melting point of the lead and above but in the vicinity of the boiling point of the zinc, so that both the zinc and cadmium are volatilized and passed through outlet 20; whereas the molten lead seeps to, and is withdrawn from, the bottom of the furnace for further refining.

In both cases the admixture of zinc and cadmium vapours may be treated as above described in connection with the apparatus of FIGS. 1–18. To produce high purity cadmium, a reflux column, as shown in FIGS. 15–18, which is operated similarly to reflux columns 200 and 236 is used. The rectified cadmium vapour is passed to a condenser, and the resulting high purity molten cadmium is cast into anodes, slabs or other useful shapes.

In the case of antimony, it occurs in the nature in both the free and combined states. The latter includes the sulphide and the oxide forms. The sulphide is roasted to form an oxide and both oxides are smelted with carbon to produce molten antimony.

Antimony is frequently found associated with the ores of lead, zinc, copper and silver, and therefore contains the metal impurities that accompany those metals. Unrefined antimony contains such impurities as iron, tin, sulphur and arsenic, and sometimes gold, silver, copper, lead, zinc, cadmium, etc.

Since antimony has a melting point of 631° C. (and a boiling point of 1380° C.), it may be fed in its molten state into the apparatus described. The more volatile sulphur, arsenic, cadmium and zinc impurities are readily distilled when the furnace charge is heated to a temperature above, but not far from the boiling point (907° C.) of the zinc, and above; the melting point of: gold, 1063° C. silver, 961° C.; copper, 1083° C.; tin, 232° C.; lead, 327° C.; etc. The resulting vapours pass through outlet 20; and they may be treated in the apparatus described; particularly for the recovery of zinc and cadium. The molten antimony and the molten less volatile metal impurities, gold, silver, copper, tin and lead sink to, and are withdrawn from the bottom of column 22. Those residual molten metals may be further refined to separate and recover high purity antimony, as well as the individual metal impurities. Such high metaling point metals as iron, 1536° C., tend to cling to and remain behind with the coke lumps in column 22.

It will be clear from the foregoing, and to those skilled in this art, that the practice of the invention just described is intended to be, and is in fact, merely illustrative; that the invention lends itself to numerous useful modifications; and that this is true of method as well as of apparatus.

I claim:

1. In apparatus for recovering at least one volatilizable metal present in an alloy of metals containing at least one other metal with a boiling point higher than the boiling point of the metal-to-be-recovered, the apparatus being in the form of an upright electrothermic heating furnace chamber; closure means at the charging and discharging ends of the chamber for keeping the chamber substantially free of oxidizing air; means at its upper portion for passing a charge to be treated into the chamber; a pair of electrodes spaced vertically extends into the charge in the interior of the chamber; an upper outlet vapour conduit connects the upper portion of the chamber for the passage of volatilized metal vapour from the chamber; the upper metal vapour conduit connects the upper portion of the chamber with a device for treating the metal vapour to convert the same into a desired end product; and an outlet conduit in the lower portion of the chamber for the withdrawal of spent residues from the chamber; the improvement in combination therewith characterized in that:

(a) the charge comprises a substantially continuous column of mixed relatively large carbon lumps and relatively small briquettes containing an alloy of metals in finely divided form confined in and made a structural operative part of the upright heating chamber, so that the column of mixed carbon lumps and metal-alloy bearing briquettes may substantially continuously descend through the electrothermic heating chamber;

(b) the electrodes extend deeply into the heating chamber in contact with the large carbon lumps and the small metal alloy briquettes to permit the generation of enough heat to melt the metal-to-be-recovered in the metal alloy briquettes, and then selectively to volatilize the metal-to-be-recovered into metal vapour;

(c) the carbon lumps and the metal alloy briquettes in the column are structural parts of the apparatus that function essentially as a physical support for and a carrier of the resulting molten metal; and the carbon lumps and metal alloy briquettes also provide interconnecting paths through which the molten metal from the metal alloy briquettes may trickle downwardly as streamlets and the metal vapour may pass upwardly;

(d) the carbon lumps and the metal-alloy briquettes are covered at least in part with continuously changing physical carriers of electrical current in the form of films of the molten metal trickling downwardly through the column in intimate contact with the carbon lumps and the metal alloy briquettes;

(e) each of the forms of the molten metal physical conductors referred to in items (b), (c) and (d) in turn functions most importantly as a carrier of the current of electricity; and (f) the trickling molten metal and the films of molten metal on the carbon lumps and on the metal alloy briquettes together provide intertwined but essential physical conductors for the current of electricity, the current taking the path of least resistance through the intertwined conductors of molten metal in preference to the carbon lumps.

2. Apparatus according to claim 1, in which said means for charging the large carbon lumps and the small metal-alloy briquettes into the chamber includes a bell and hopper charging device at the top of the electrothermic furnace for feeding intermittently the large carbon lumps and the small metal-alloy briquettes onto the top of the column within the electrothermic heating chamber.

3. Apparatus according to claim 1, in which control means connect with the electrodes to maintain electrically a predetermined and desired temperature within the chamber, a temperature to melt a controlled amount of the metal-to-be-recovered and then selectively to volatilize the same.

4. Apparatus according to claim 1, in which a voltage regulator connects with the electrodes to maintain electrically a predetermined and desired temperature within the chamber, a temperature to melt a controlled amount of the metal-to-be-recovered and then selectively to volatilize the same.

5. Apparatus according to claim 1, in which the outlet vapour conduit in the upper portion of the electrothermic heating chamber communicates with a condenser for condensing the selectively volatilized metal vapour into a body of molten metal.

6. Apparatus according to claim 1, in which the selectively volatilized metal vapour outlet conduit connects with a metal powder condensing system.

7. Apparatus according to claim 1, in which the selectively volatilized metal vapour outlet conduit connects with a cool inert gas circulatory system for condensing metal vapour issuing from the outlet conduit into the system to produce finely divided metal powder.

8. Apparatus according to claim 1, in which the selectively volatilized metal vapour outlet conduit connects with a cool inert gas circulatory system for condensing metal vapour issuing from the outlet conduit into the system into finely divided metal powder; and the circulatory system is provided with a compressor to keep the circulating inert gas at a pressure above atmospheric to inhibit ingress of outside air into the system.

9. Apparatus according to claim 1, in which the selectively volatilized metal vapour outlet conduit communicates with an oxidizing chamber filled with air for converting a stream of metal vapour issuing from the vapour conduit into metal oxide.

10. Apparatus according to claim 1, in which the selectively volatilized metal vapour outlet conduit terminates in a surrounding cool inert gas distributing chamber; and the cool inert gas distributing chamber is provided with a plurality of peripherally spaced jets for injecting a plurality of streamlets of cool inert gas obliquely into a main stream of metal vapour issuing from the conduit to convert the same into finely divided metal powder.

11. Apparatus according to claim 1, in which the lower end of the furnace is provided with means for specially cooling the lower end of the descending column of large carbon lumps and spent metal-containing small briquettes.

12. Apparatus according to claim 1, in which the wall of the lower end of the furnace is provided with a coil for the passageway therethrough of a stream of water for specially cooling the lower end of the descending column of large carbon lumps and spent metal-containing small briquettes.

13. Apparatus according to claim 1, in which the lower end of the furnace terminates in means for withdrawing the large carbon lumps and spent metal-containing small briquettes from the lower end of the column.

14. Apparatus according to claim 1, in which the lower end of the furnace well below the lower electrode terminates in a revolvable platform for withdrawing the large carbon lumps and spent metal-containing small briquettes from the lower end of the column.

15. Apparatus according to claim 1, in which the lower end of the furnace well below the lower electrode is surrounded by a snugly fitting casing for inhibiting the entrance of outside oxidizing air into the furnace from its bottom.

16. Apparatus according to claim 1, in which the lower end of the furnace well below the lower electrode is surrounded by a snugly fitting casing for inhibiting the entrance of outside oxidizing air into the furnace from its bottom; and the casing is provided with a constricted outlet conduit at the bottom portion thereof for the withdrawal of large carbon lumps and spent metal-containing small briquettes to inhibit when full of same ingress of outside oxidizing air.

17. Apparatus according to claim 1, in which the lower end of the furnace well below the lower electrode terminates in a revolvable platform for withdrawing the large carbon lumps and spent metal-containing small briquettes from the lower end of the column; and the lower end of the furnace and the revolvable platform are surrounded by a snugly fitting casing for inhibiting the entrance of outside oxidizing air into the furnace from its bottom.

18. Apparatus according to claim 1, in which the lower end of the furnace well below the lower electrode is surrounded by a snugly fitting casing for inhibiting the entrance of outside oxidizing air into the furnace from its bottom; and the casing is fitted with a valved inlet and a valved outlet for the passage through the casing of inert gas under pressure to help cool the lower end of the column and to inhibit ingress of outside oxidizing air into the casing.

19. Apparatus according to claim 1, in which the lower end of the furnace well below the lower electrode is surrounded by a snugly fitting casing for inhibiting the entrance of outside oxidizing air into the furnace from its bottom; the casing is fitted with a valved inlet and a valved outlet for the passage through the casing of compressed inert gas under pressure to help cool the lower end of the column and to inhibit ingress of outside oxidizing air into the casing; and to build up in the casing an inert gas pressure higher than the prevailing pressure within the heating chamber of the electrothermic furnace.

20. Apparatus according to claim 1, in which the lower end of the furnace well below the lower electrode terminates in means for withdrawing the large carbon lumps and spent metal-containing small briquettes from the lower end of the column; and the withdrawing means connect a screen for separating the large carbon lumps from the spent metal-containing small briquettes.

21. Apparatus according to claim 1, in which the lower end of the furnace well below the lower electrode terminates in means for withdrawing the large carbon lumps and spent metal-containing small briquettes from the lower end of the column; the withdrawing means connect a screen for separating the large carbon lumps from the spent metal-containing small briquettes; and a conveyor connects with the screen for carrying the screened large carbon lumps back to the top of the column for reuse in the electrothermic furnace.

References Cited

UNITED STATES PATENTS

| | | | |
|---|---|---|---|
| 920,473 | 5/1909 | Johnson | 13—23 |
| 1,901,525 | 3/1933 | Moschel | 13—23 |
| 2,200,873 | 5/1940 | Cyr | 23—47 |
| 746,798 | 12/1903 | Danckwardt | 75—14 |
| 1,738,910 | 12/1929 | Lepsoe | 75—14 X |
| 1,743,886 | 1/1930 | Gaskill | 75—14 |
| 1,773,779 | 8/1930 | Gaskill | 75—14 |
| 1,800,500 | 4/1931 | Bleecker | 75—14 |
| 2,464,262 | 3/1949 | Robson et al. | 75—86 |
| 2,978,315 | 4/1961 | Schenck et al. | 75—0.5 |

J. SPENCER OVERHOLSER, *Primary Examiner.*

EUGENE MAR, *Assistant Examiner.*

U.S. Cl. X.R.

13—23; 75—86

PO-1050
(5/69)

UNITED STATES PATENT OFFICE
CERTIFICATE OF CORRECTION

Patent No. ___3,448,973___  Dated___June 10, 1969___

Inventor(s)___L. J. Derham___

It is certified that error appears in the above-identified patent and that said Letters Patent are hereby corrected as shown below:

Column 1, line 43, change "provided" to --provide--; line 55, after "489,267" insert --and 489,268--.

Column 2, line 65, change "substantailly" to --substantially--.

Column 3, line 17, change "volalized" to --volatalized--; line 32, change "aluminum," to --aluminum.--; line 41, change "bsiquettes" to --briquettes--.

Column 4, line 19, change "reflux" to --refluxer--.

Column 8, line 17, change "Intially" to --Initially--; line 36, change "tip" to --tips--.

Column 9, line 20, change "necesasry" to --necessary--; line 39, change "duct" to --dust--; line 40, change "duct" to --dust--.

Column 10, line 74, change "exhause" to --exhaust--.

Column 15, line 51, change "larger" to --large--; line 51, after "from" insert --outlet (inlet) 20. As a result of the agitation, mixing--; line 62, change "hourse" to --house--.

Column 16, line 10, change "received" to --receiving--; line 52, change "bricks" to --brick--.

Column 19, line 31, after "coke" insert --22--; line 32, cancel "22".

Column 22, line 30, after "They" insert --may--.

Signed and sealed this 3rd day of October 1972.

(SEAL)
Attest:

EDWARD M. FLETCHER, JR.
Attesting Officer

ROBERT GOTTSCHALK
Commissioner of Patents